United States Patent
Awada et al.

(10) Patent No.: US 11,895,549 B2
(45) Date of Patent: Feb. 6, 2024

(54) ENHANCED MOBILITY IN CELLULAR DEPLOYMENTS WITH NETWORK SLICING

(71) Applicant: Nokia Technologies Oy, Espoo (FI)

(72) Inventors: Ahmad Awada, Munich (DE); Jedrzej Stanczak, Wroclaw (PL); Muhammad Naseer-Ul-Islam, Munich (DE); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 216 days.

(21) Appl. No.: 17/424,464

(22) PCT Filed: Jan. 21, 2020

(86) PCT No.: PCT/IB2020/050450
§ 371 (c)(1),
(2) Date: Jul. 20, 2021

(87) PCT Pub. No.: WO2020/165665
PCT Pub. Date: Aug. 20, 2020

(65) Prior Publication Data
US 2022/0124587 A1  Apr. 21, 2022

Related U.S. Application Data

(60) Provisional application No. 62/803,845, filed on Feb. 11, 2019.

(51) Int. Cl.
*H04W 36/22* (2009.01)
*H04W 36/00* (2009.01)

(52) U.S. Cl.
CPC ....... *H04W 36/22* (2013.01); *H04W 36/0055* (2013.01); *H04W 36/0083* (2013.01)

(58) Field of Classification Search
CPC . H04W 36/0033; H04W 36/08; H04W 36/26; H04W 36/0072; H04W 36/22; H04W 36/0055
See application file for complete search history.

(56) References Cited

U.S. PATENT DOCUMENTS

2016/0227459 A1* 8/2016 Fujishiro .............. H04W 36/28
2017/0164349 A1  6/2017 Zhu et al.
(Continued)

FOREIGN PATENT DOCUMENTS

WO  2018/006017 A1  1/2018
WO  2018/029933 A1  2/2018
(Continued)

OTHER PUBLICATIONS

Office action received for corresponding Indian Patent Application No. 202147040931, dated Apr. 6, 2022, 5 pages.
(Continued)

*Primary Examiner* — Allahyar Kasraian
(74) *Attorney, Agent, or Firm* — Harrington & Smith

(57) ABSTRACT

Systems, methods, apparatuses, and computer program products for source cell to provide a service/slice indication to the target cell in the handover preparation. The source cell provides to a target cell a list of one or more service/slice specific indications for individual ones of one or more network slices in a request for enhanced handover from the source cell to the target cell in a handover preparation phase. The source cell receives from the target cell, indications in a handover request acknowledgement of one or more selected network slices to be handed over from the source cell to the target cell using enhanced handovers. Performs make-before-break handovers to hand over these selected network slices from the source cell to the target cell and performs normal handovers for the one or more other network slices.

24 Claims, 18 Drawing Sheets

(56) References Cited

U.S. PATENT DOCUMENTS

| | | |
|---|---|---|
| 2018/0324646 A1 | 11/2018 | Lee et al. |
| 2018/0324663 A1 | 11/2018 | Park et al. |
| 2019/0037522 A1 | 1/2019 | Tenny et al. |
| 2019/0191348 A1* | 6/2019 | Futaki ............... H04W 36/0033 |
| 2020/0100101 A1* | 3/2020 | Torvinen ............... H04L 63/205 |
| 2022/0046427 A1* | 2/2022 | Futaki ................... H04W 76/27 |

FOREIGN PATENT DOCUMENTS

| | | |
|---|---|---|
| WO | 2018/128529 A1 | 7/2018 |
| WO | 2018/171904 A1 | 9/2018 |
| WO | 2018/215076 A1 | 11/2018 |

OTHER PUBLICATIONS

"New WID: NR Mobility Enhancements", 3GPP TSG RAN Meeting #80, RP-181433, Agenda : 9.1.10, Intel Corporation, May 21-25, 2018, 5 pages.

"Split Bearer Solution for Reducing the Service Interruption Time", 3GPP TSG-RAN WG2 Meeting #104, R2-1817690, Agenda : 12.3.2, Nokia, Nov. 12-16, 2018, 5 pages.

"Non-Split Bearer Solution for Reducing the Service Interruption Time in HO", 3GPP TSG-RAN WG2 Meeting #104, R2-1817691, Agenda : 12.3.2, Nokia, Nov. 12-16, 2018, 8 pages.

"Alternative eMBB Handover Procedure with Close-to-zero ms Interruption", 3GPP TSG-RAN WG2 Meeting #104, R2-1817692, Agenda : 12.3.2, Nokia, Nov. 12-16, 2018, 7 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.3.0, Sep. 2018, pp. 1-358.

"3rd Generation Partnership Project; Technical Specification Group Radio Access Network; NG-RAN; Xn application protocol (XnAP) (Release 15)", 3GPP TS 38.423 V15.1.0, Sep. 2018, pp. 1-263.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.1.0, Mar. 2018, pp. 1-786.

"3rd Generation Partnership Project; Technical Specification Group Radio Access Network; NG-RAN; Xn application protocol (XnAP) (Release 15)", 3GPP TS 38.423, V15.0.0, Jun. 2018, pp. 1-195.

"3rd Generation Partnership Project; Technical Specification Group Radio Access Network; NG-RAN; NG Application Protocol (NGAP) (Release 15)", 3GPP TS 38.413, V15.1.0, Sep. 2018, pp. 1-295.

"3rd Generation Partnership Project; Technical Specification Group Services and System Aspects; Security architecture and procedures for 5G system (Release 15)", 3GPP TS 33.501, V15.2.0, Sep. 2018, pp. 1-175.

Ravindran et al., "Enabling ICN in 3GPP's 5G NextGen Core Architecture", ICNRG, Internet-Draft, Feb. 27, 2018, pp. 1-25.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.8.0, Sep. 2018, pp. 1-331.

"3rd Generation Partnership Project; Technical Specification Group Radio Access Network; NR; NR and NG-RAN Overall Description; Stage 2 (Release 15)", 3GPP TS 38.300, V15.4.0, Dec. 2018, pp. 1-97.

"3rd Generation Partnership Project; Technical Specification Group Services and System Aspects; System Architecture for the 5G System; Stage 2 (Release 15)", 3GPP TS 23.501, V15.4.0, Dec. 2018, pp. 1-236.

"3rd Generation Partnership Project; Technical Specification Group Radio Access Network; NG-RAN; Xn application protocol (XnAP) (Release 15)", 3GPP TS 38.423, V15.2.0, Dec. 2018, pp. 1-281.

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.

International Search Report and Written Opinion received for corresponding Patent Cooperation Treaty Application No. PCT/IB2020/050450, dated Mar. 25, 2020, 15 pages.

"Introduction of "Mainta in Source eNB Connection Solution"", 3GPP TSG RAN WG3 Meeting #93bis, R3-162137, Samsung, Oct. 10-14, 2016, 9 pages.

"Considering Slice Related Information during Mobility", 3GPP TSG-RAN WG3 Meeting #97, R3-173197, Agenda : 10.2, LG Electronics Inc., Aug. 21-25, 2017, 12 pages.

* cited by examiner

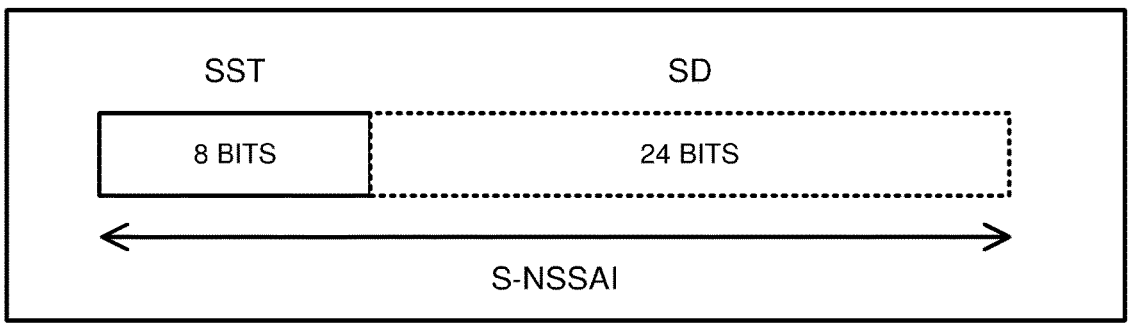
FIG. 3
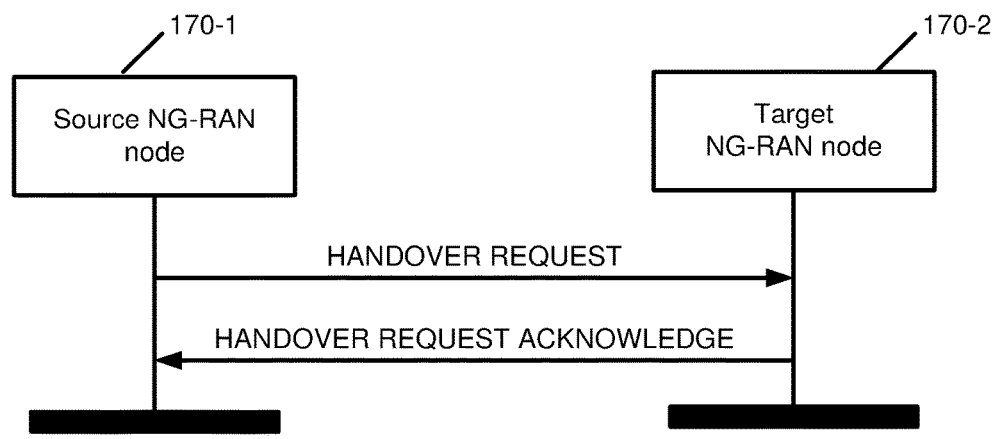
FIG. 4
```
HandoverPreparationInformation-v1430-IEs ::= SEQUENCE {
    as-Config-v1430         AS-Config-v1430        OPTIONAL,  -- Cond HO2
    makeBeforeBreakReq-r14  ENUMERATED {true}      OPTIONAL,  -- Cond HO2
    nonCriticalExtension    SEQUENCE {}            OPTIONAL
}                         ↖610
```
FIG. 6

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID reference | M | | NG-RAN node UE XnAP ID 9.2.3.16 | Allocated at the source NG-RAN node | YES | reject |
| Cause | M | | 9.2.3.2 | | YES | reject |
| Target Cell Global ID | M | | 9.2.3.25 | Includes either an E-UTRA CGI or an NR CGI | YES | reject |
| GUAMI | M | | 9.2.3.24 | | YES | reject |
| UE Context Information | M | 1 | | | YES | reject |
| >NG-C UE associated Signalling reference | M | | AMF UE NGAP ID 9.2.3.26 | Allocated at the AMF on the source NG-C connection. | – | |
| >Signalling TNL association address at source NG-C side | M | | CP Transport Layer Information 9.2.3.31 | This IE indicates the AMF's IP address of the SCTP association used at the source NG-C interface instance. | – | |
| >UE Security Capabilities | M | | 9.2.3.49 | | – | |
| >AS Security Information | M | | 9.2.3.50 | | – | |
| >Index to RAT/Frequency Selection Priority | O | | 9.2.3.23 | | – | |
| >UE Aggregate Maximum Bit Rate | M | | 9.2.3.17 | | – | |
| >PDU Session Resources To Be Setup List ←510 | | 1 | 9.2.1.1 | Similar to NG-C signalling, containing UL tunnel information per PDU Session Resource; and in addition, the source side QoS flow ⇔ DRB mapping | – | |
| >RRC Context ←520 | M | | OCTET STRING | Either includes the *HandoverPreparationInformation* message as defined in subclause 10.2.2. of TS 36.331 [14], if the target NG-RAN node is an ng-eNB, or the *HandoverPreparationInformation* message as defined in subclause 11.2.2 of TS 38.331 [9], if the target NG-RAN node is a gNB. | – | |

FIG. 5

| IE/Group Name | Presence | Range | IE type and reference | Semantics description | Criticality | Assigned Criticality |
|---|---|---|---|---|---|---|
| PDU Session Resources To Be Setup List | | 1 | | | — | |
| >PDU Session Resources To Be Setup Item  540 | | 1 .. \<maxno of PDU sessions> | | | — | |
| >>PDU Session ID | M | | 9.2.3.18 | | — | |
| >>S-NSSAI | M | | 9.2.3.21 | | — | |
| >>PDU Session Resource Aggregate Maximum Bitrate | M | | 9.2.3.69 | This IE shall be present when at least one non-GBR QoS Flows are been setup. | — | |
| >>UL NG-U UP TNL Information at UPF | M | | UP Transport Layer Information 9.2.3.30 | UPF endpoint of the NG-U transport bearer. For delivery of UL PDUs | — | |
| >>Security Indication | O | | 9.2.3.52 | | — | |
| >>PDU Session Type | M | | 9.2.3.19 | | — | |
| >>QoS Flows To Be Setup List | | 1 | | | — | |
| >>>QoS Flows To Be Setup Item | | 1 .. \<maxno ofQoSFlows> | | | — | |
| >>>>QoS Flow Indicator | M | | 9.2.3.10 | | — | |
| >>>>DL data Forwarding | O | | 9.2.3.34 | | — | |
| >>>>QoS Flow Level QoS Parameters | M | | 9.2.3.5 | | — | |
| >>>>E-RAB ID | O | | INTEGER (0..15, ...) | | — | |
| >>Source DRB to QoS Flow Mapping List | O | | DRB to QoS Flow Mapping List 9.2.1.15 | | — | |

FIG. 5A

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID | M | | NG-RAN node UE XnAP ID 9.2.3.16 | Allocated at the source NG-RAN node | YES | ignore |
| Target NG-RAN node UE XnAP ID | M 710 | | NG-RAN node UE XnAP ID 9.2.3.16 | Allocated at the target NG-RAN node | YES | ignore |
| PDU Session Resources Admitted List | M | | 9.2.1.2 | | YES | ignore |
| PDU Session Resources Not Admitted List | O | | 9.2.1.3 | | YES | ignore |
| Target NG-RAN node To Source NG-RAN node Transparent Container 730 | M 720 | | OCTET STRING | Either includes the *HandoverCommand* message as defined in subclause 10.2.2 of TS 36.331 [14], if the target NG-RAN node is an ng-eNB, or the *HandoverCommand* message as defined in subclause 11.2.2 of TS 38.331 [9], if the target NG-RAN node is a gNB. | YES | ignore |

FIG. 7

| IE/Group Name | Presence | Range | IE type and reference | Semantics description | Criticality | Assigned Criticality |
|---|---|---|---|---|---|---|
| PDU Session Resources Admitted List | | 1 | | | — | |
| >PDU Session Resources Admitted Item | | 1..<maxnoofPDUSessions> | | | — | |
| >>PDU Session ID | M | | 9.2.3.18 | | — | |
| >>QoS Flows Admitted List | | 1 | | | — | |
| >>>QoS Flows Admitted Item | | 1..<maxnoofQoSFlows> | | | — | |
| >>>>QoS Flow Indicator | M | | 9.2.3.10 | | — | |
| >>>>Data Forwarding Accepted | O | | 9.2.3.35 | | — | |
| >>QoS Flows not Admitted List | | 0..1 | | | — | |
| >>>QoS Flows not Admitted Item | O | 1..<maxnoofQoSFlows> | | | — | |
| >>>>QoS Flow Indicator | M | | 9.2.3.10 | | — | |
| >>>>Cause | M | | 9.2.3.2 | | — | |
| >>Data Forwarding Info from target NG-RAN node | O | | 9.2.1.16 | | — | |

FIG. 7A

| IE/Group Name | Presence | Range | IE type and reference | Semantics description | Criticality | Assigned Criticality |
|---|---|---|---|---|---|---|
| PDU Session Resources Not Admitted List | | 1 | | | — | |
| >PDU Session Resources Not Admitted Item | | 1..<maxnoofPDUSessions> | | | — | |
| >>PDU Session ID | M | | 9.2.3.18 | | — | |
| >>Cause | O | | 9.2.3.2 | | — | |

FIG. 7B

```
RRCConnectionReconfiguration-r8-IEs ::= SEQUENCE {
    measConfig              MeasConfig          OPTIONAL,  -- Need ON
    mobilityControlInfo     MobilityControlInfo OPTIONAL,  -- Cond HO
    dedicatedInfoNASList810 SEQUENCE (SIZE(1..maxDRB)) OF
                            DedicatedInfoNAS    OPTIONAL,  -- Cond nonHO
    radioResourceConfigDedicated
                            RadioResourceConfigDedicated
                                                OPTIONAL,  -- Cond HO-toEUTRA
    securityConfigHO        SecurityConfigHO    OPTIONAL,  -- Cond HO
    nonCriticalExtension    RRCConnectionReconfiguration-v890-Ies
                                                OPTIONAL
}
```

FIG. 8

```
-- ASN1START
MobilityControlInfo ::= SEQUENCE {
        targetPhysCellId     PhysCellId,
        carrierFreq          CarrierFreqEUTRA        OPTIONAL,-- Cond HO-toEUTRA2
        carrierBandwidth     CarrierBandwidthEUTRA   OPTIONAL, -- Cond HO-toEUTRA
        additionalSpectrumEmission  AdditionalSpectrumEmission
                                                     OPTIONAL,  -- Cond HO-toEUTRA
        t304                 ENUMERATED {
                                ms50, ms100, ms150, ms200, ms500, ms1000,
                                ms2000, ms10000-v1310},
        newUE-Identity       C-RNTI,
        radioResourceConfigCommon RadioResourceConfigCommon,
        rach-ConfigDedicated RACH-ConfigDedicated    OPTIONAL,  -- Need OP
        ...,
        [[ carrierFreq-v9e0  CarrierFreqEUTRA-v9e0   OPTIONAL    -- Need ON
        ]],
        [[ drb-ContinueROHC-r11
                             ENUMERATED {true} OPTIONAL    -- Cond HO
        ]],
        [[ mobilityControlInfoV2X-r14
                             MobilityControlInfoV2X-r14  OPTIONAL,  -- Need ON
           handoverWithoutWT-Change-r14
                             ENUMERATED {keepLWA-Config, sendEndMarker}
                             910           OPTIONAL,   -- Cond HO
           makeBeforeBreak-r14 ENUMERATED {true}    OPTIONAL,   -- Need OR
           rach-Skip-r14     RACH-Skip-r14          OPTIONAL,   -- Need OR
           sameSFN-Indication-r14 ENUMERATED {true}
                                                    OPTIONAL -- Cond HO-SFNsynced
        ]],
        [[
           mib-RepetitionStatus-r14 BOOLEAN         OPTIONAL, -- Need OR
           schedulingInfoSIB1-BR-r14 INTEGER (0..31)
                                                    OPTIONAL -- Cond HO-SFNsynced
        ]]
}
MobilityControlInfo-v10l0 ::= SEQUENCE {
        additionalSpectrumEmission-v10l0 AdditionalSpectrumEmission-v10l0
                                                    OPTIONAL -- Need ON
}
MobilityControlInfoSCG-r12 ::= SEQUENCE {
        t307-r12             ENUMERATED {
                                ms50, ms100, ms150, ms200, ms500, ms1000,
                                ms2000, spare1},
        ue-IdentitySCG-r12   C-RNTI                 OPTIONAL,   -- Cond SCGEst,
        rach-ConfigDedicated-r12  RACH-ConfigDedicated  OPTIONAL, -- Need OP
        cipheringAlgorithmSCG-r12 CipheringAlgorithm-r12  OPTIONAL, -- Need ON
        ...,
        [[     makeBeforeBreakSCG-r14   ENUMERATED {true}
                                                    OPTIONAL,   -- Need OR
               rach-SkipSCG-r14  920  RACH-Skip-r14  OPTIONAL    -- Need OR
        ]]
}
```

FIG. 9

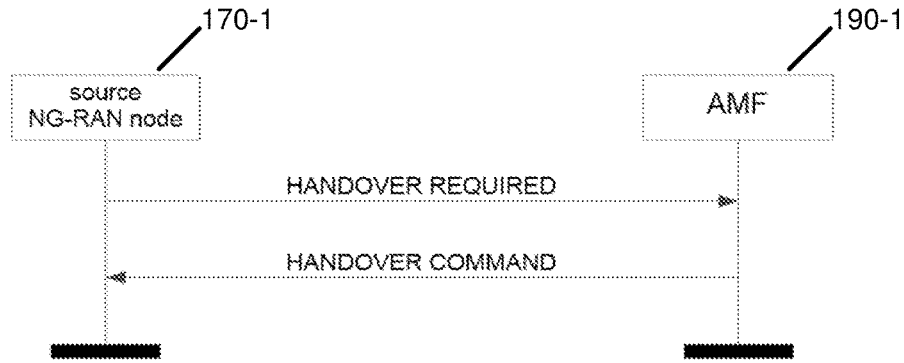

FIG. 10

FIG. 11

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Handover Type | M | | 9.3.1.22 | | YES | reject |
| Cause | M | | 9.3.1.2 | | YES | ignore |
| Target ID | M | | 9.3.1.25 | | YES | reject |
| Direct Forwarding Path Availability | O | | 9.3.1.64 | | YES | ignore |
| PDU Session Resource List 1210 | | 1 | | | YES | reject |
| >PDU Session Resource Item 1220 | | 1..<maxno ofPDUSes sions> | | | - | |
| >>PDU Session ID | M | | 9.3.1.50 | | - | |
| >>Handover Required Transfer | M | | OCTET STRING | Containing the Handover Required Transfer IE specified in subclause 9.3.4.14. | - | |
| Source to Target Transparent Container | M | | 9.3.1.20 | | YES | reject |

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Handover Type | M | | 9.3.1.22 | | YES | reject |
| NAS Security Parameters from NG-RAN | C-iftoEPS | | 9.3.3.26 | The NG-RAN node shall use this IE as specified in TS 33.501 [13]. | YES | reject |
| PDU Session Resource Handover List 1310 | | 1 | | | YES | ignore |
| >PDU Session Resource Handover Item 1320 | | 1..<maxno ofPDUSes sions> | | | - | |
| >>PDU Session ID | M | | 9.3.1.50 | | - | |
| >>Handover Command Transfer | M | | OCTET STRING | Containing the Handover Command Transfer IE specified in subclause 9.3.4.10. | - | |
| PDU Session Resource to Release List | | 0..1 | | | YES | ignore |
| >PDU Session Resource to Release Item | | 1..<maxno ofPDUSes sions> | | | - | |
| >>PDU Session ID | M | | 9.3.1.50 | | - | |
| >>Handover Preparation Unsuccessful Transfer | M | | OCTET STRING | Containing the Handover Preparation Unsuccessful Transfer IE specified in subclause 9.3.4.18. | - | |
| Target to Source Transparent Container 1330 | M | | 9.3.1.21 | | YES | reject |
| Criticality Diagnostics | O | | 9.3.1.3 | | YES | ignore |

FIG. 13

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| Handover Type | M | | 9.3.1.22 | | YES | reject |
| Cause | M | | 9.3.1.2 | | YES | ignore |
| UE Aggregate Maximum Bit Rate | M | | 9.3.1.58 | | YES | reject |
| Core Network Assistance Information | O | | 9.3.1.15 | | YES | ignore |
| UE Security Capabilities | M | | 9.3.1.66 | | YES | reject |
| Security Context | M | | 9.3.1.88 | | YES | reject |
| New Security Context Indicator | O | | 9.3.1.55 | | YES | reject |
| NASC | O | | NAS-PDU 9.3.3.4 | Containing either the "Intra N1 mode NAS transparent container" or the "S1 mode to N1 mode NAS transparent container" specified in TS 24.501 [26]. | YES | reject |
| PDU Session Resource Setup List  1410 | | 1 | | | YES | reject |
| >PDU Session Resource Setup Item  1420 | | 1..<maxnoofPDUSessions> | | | - | - |
| >>PDU Session ID | M | | 9.3.1.50 | | - | - |
| >>S-NSSAI | M | | 9.3.1.24 | | - | - |
| >>Handover Request Transfer  1430 | M | | OCTET STRING | Containing the *PDU Session Resource Setup Request Transfer* IE specified in subclause 9.3.4.1 | - | - |
| Allowed NSSAI | M | | 9.3.1.31 | Indicates the S-NSSAIs permitted by the network. | YES | ignore |
| Trace Activation | O | | 9.3.1.14 | | YES | ignore |
| Masked IMEISV | O | | 9.3.1.54 | | YES | ignore |
| Source to Target Transparent Container | M | | 9.3.1.20 | | YES | reject |
| Mobility Restriction List  1440 | O | | 9.3.1.85 | | YES | ignore |
| Location Reporting Request Type | O | | 9.3.1.65 | | YES | ignore |
| RRC Inactive Transition Report Request | O | | 9.3.1.91 | | YES | ignore |
| GUAMI | M | | 9.3.3.3 | | YES | reject |

FIG. 14

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | ignore |
| RAN UE NGAP ID | M | | 9.3.3.2 | Allocated at the target NG-RAN node. | YES | ignore |
| PDU Session Resource Admitted List 1510 | | 1 | | | YES | ignore |
| >PDU Session Resource Admitted Item 1520 | | 1..<maxno ofPDUSessions> | | | - | |
| >>PDU Session ID | M | | 9.3.1.50 | | - | |
| >>Handover Request Acknowledge Transfer 1530 | M | | OCTET STRING | Containing the Handover Request Acknowledge Transfer IE specified in subclause 9.3.4.11. | - | |
| PDU Session Resource Failed to Setup List | | 0..1 | | | YES | ignore |
| >PDU Session Resource Failed to Setup Item | | 1..<maxno ofPDUSessions> | | | - | |
| >>PDU Session ID | M | | 9.3.1.50 | | - | |
| >>Handover Resource Allocation Unsuccessful Transfer 1540 | M | | OCTET STRING | Containing the Handover Resource Allocation Unsuccessful Transfer IE specified in subclause 9.3.4.19. | - | |
| Target to Source Transparent Container | M | | 9.3.1.21 | | YES | reject |
| Criticality Diagnostics | O | | 9.3.1.3 | | YES | ignore |

FIG. 15

| IE/Group Name | Presence | Range | IE type and reference | Semantics description |
|---|---|---|---|---|
| Target to Source Transparent Container | M | | OCTET STRING | This IE includes a transparent container from the target RAN node to the source RAN node. The octets of the OCTET STRING are encoded according to the specifications of the target system.<br>Note: In the current version of the specification, this IE may carry either the *Target NG-RAN Node to Source NG-RAN Node Transparent Container* IE or the *Target eNB to Source eNB Transparent Container* IE as defined in TS 36.413 [16] |

FIG. 16

| IE/Group Name | Presence | Range | IE type and reference | Semantics description |
|---|---|---|---|---|
| RRC Container | M | | OCTET STRING | Includes the RRC *HandoverCommand* message as defined in TS 38.331 [18] if the target is a gNB.<br>Includes the RRC *HandoverCommand* message as defined in TS 36.331 [21] if the target is an ng-eNB. |

FIG. 17

| IE/Group Name | Presence | Range | IE type and reference | Semantics description |
|---|---|---|---|---|
| Source to Target Transparent Container | M | | OCTET STRING | This IE includes a transparent container from the source RAN node to the target RAN node. The octets of the OCTET STRING are encoded according to the specifications of the target system.<br>Note: In the current version of the specification, this IE may carry either the Source NG-RAN Node to Target NG-RAN Node Transparent Container IE or the Source eNB to Target eNB Transparent Container IE as defined in TS 36.413 [16]. |

FIG. 18

| IE/Group Name | Presence | Range | IE type and reference | Semantics description |
|---|---|---|---|---|
| RRC Container  ←1910 | M | | OCTET STRING | Includes the RRC HandoverPreparationInformation message as defined in TS 38.331 [18] if the target is a gNB. Includes the RRC HandoverPreparationInformation message as defined in TS 36.331 [21] if the target is an ng-eNB.  ←1920 |
| PDU Session Resource Information List | | 0..1 | | For intra-system handovers in NG-RAN. |
| >PDU Session Resource Information Item IEs | | 1..<maxnoofPDUSessions> | | |
| >>PDU Session ID | M | | 9.3.1.50 | |
| >>QoS Flow Information List | | 1 | | |
| >>>QoS Flow Information Item IEs | | 1..<maxnoofQoSFlows> | | |
| >>>>QoS Flow Indicator | M | | 9.3.1.51 | |
| >>>>DL Forwarding | O | | 9.3.1.33 | |
| >>DRBs to QoS Flows Mapping List | | | 9.3.1.34 | |
| E-RAB Information List | | 0..1 | | For inter-system handovers to 5G. |
| >E-RAB Information Item IEs | | 1..<maxnoofE-RABs> | | |
| >>E-RAB ID | M | | 9.3.2.3 | |
| >>DL Forwarding | O | | 9.3.1.33 | |
| Target Cell ID | M | | NG-RAN CGI 9.3.1.73 | |
| Index to RAT/Frequency Selection Priority | O | | 9.3.1.61 | |

FIG. 19

Choose for which services/slices the source cell wants to support the enhanced HO, depending on its resource utilization status and the service characteristics of different slices to which the UE is connected (e.g., the tolerance for user service interruption per particular service)

FIG. 20A

A. Indicate list of slices to be handed over to target cell; and
B. The HO type indication can be indicated as follows:
1. Provide a full list of slices with their corresponding HO types, or
2. Provide only the list of slices that require enhanced HO and the other slices are assumed to be handed over with normal HO HO request 2017

FIG. 20B

Indicate acceptance of or rejection of all or a subset of the provided slices (includes HO command message) in the list:
1. Provide a full list of slices with accepted or rejected indications, or
2. Provide only the list of slices that require enhanced HO and their corresponding accepted or rejected indications (other slices are assumed to be accepted)

HO request Ack 2033

FIG. 20C

A. Indicate list of slices to be handed over to target cell; and
B. The HO type indication can be indicated as follows:
1. Provide a full list of slices with their corresponding HO types, or
2. Provide only the list of slices that require enhanced HO and the other slices are assumed to be handed over with normal HO HO command 2043

FIG. 20D

ENHANCED MOBILITY IN CELLULAR DEPLOYMENTS WITH NETWORK SLICING

RELATED APPLICATION

This application claims priority to PCT Application No. PCT/IB2020/050450, filed on Jan. 21, 2020, which claims priority to U.S. application Ser. No. 62/803845, filed on Feb. 11, 2019, each of which is incorporated herein by reference in its entirety.

TECHNICAL FIELD

This invention relates generally to mobility for user equipment in a cellular network and, more specifically, relates to enhancing such mobility.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

A handover is performed to transfer operation of a user equipment (UE) from one base station to another in a cellular network. We will use the term base station (BS) herein to refer to a next generation Node B (gNB) in a 5G New Radio (NR) system or to any access point in general. It is also noted that in NR, a base station may also be referred to as a Radio Access Network (RAN) node and comprise a gNB, as described below. Whenever there is a handover of a UE from one base station to another, there is usually an interruption, if only for a relatively short time period.

Several solutions have been proposed in RAN2 #104 for reducing the service interruption to 0 ms (zero milliseconds) or close to 0 ms during handover (HO) in LTE systems. Similar solutions may be adopted for NR systems. See the following documents: R2-1817690, Split bearer solution for reducing the service interruption time in HO, 3GPP TSG-RAN WG2 Meeting #104, Spokane, US, 12-16 Nov. 2018; R2-1817691, Non-split bearer solution for reducing the service interruption time in HO, 3GPP TSG-RAN WG2 Meeting #104, Spokane, US, 12-16 Nov. 2018; and R2-1817692, Alternative eMBB handover procedure with close-to-zero ms interruption, 3GPP TSG-RAN WG2 Meeting #104, Spokane, USA, 12-16 Nov. 2018. All these assume that the UE is equipped with two transceivers (TRXs), connects simultaneously to source and target BSs during the HO, and/or continues to exchange data communication with the source BS after receiving the handover command That is, during the HO, the UE first establishes the radio link with respect to the target BS before releasing the link of the source BS, which can help to achieve 0ms or close to 0ms interruption time.

As such, all the proposed techniques fall under the umbrella of "make-before-break" methods, although the naming of each specific solution stated in the documents cited above may differ, such as a "split-bearer" solution, or a "non-split bearer" solution. These make-before-break methods can still be improved.

SUMMARY

Various aspects of examples of the invention are set out in the claims.

In a first aspect thereof the exemplary embodiments of this invention provide a method that comprises providing, by a source cell and to a target cell in a wireless network, a list of one or more service/slice specific indications for individual ones of one or more network slices in a request for enhanced handover of a user equipment from the source cell to the target cell, the providing performed in a handover preparation phase prior to handover of the user equipment; receiving, by the source cell and from the target cell, indications in a handover request acknowledgement of one or more selected network slices to be handed over from the source cell to the target cell using enhanced handovers; for the one or more selected network slices, performing make-before-break handovers to hand over these one or more selected network slices from the source cell to the target cell; and for one or more other network slices to be handed over for the user equipment from the source cell to the target cell, performing normal handovers for the one or more other network slices.

In a second aspect thereof the exemplary embodiments of this invention provide an apparatus that comprises means for providing, by a source cell and to a target cell in a wireless network, a list of one or more service/slice specific indications for individual ones of one or more network slices in a request for enhanced handover of a user equipment from the source cell to the target cell, the providing performed in a handover preparation phase prior to handover of the user equipment; means for receiving, by the source cell and from the target cell, indications in a handover request acknowledgement of one or more selected network slices to be handed over from the source cell to the target cell using enhanced handovers; means, for the one or more selected network slices, for performing make-before-break handovers to hand over these one or more selected network slices from the source cell to the target cell; and means, for one or more other network slices to be handed over for the user equipment from the source cell to the target cell, for performing normal handovers for the one or more other network slices.

In a third aspect thereof the exemplary embodiments of this invention provide an apparatus that comprises means for receiving, at a user equipment and from a source cell in a wireless network, a list of one or more service/slice specific indications for individual ones of one or more network slices in a handover command for enhanced handover of the user equipment to a target cell in the wireless network, the receiving performed in a handover preparation phase prior to handover of the user equipment; means, for the one or more network slices to be handed over for the user equipment using enhanced handovers, for maintaining two simultaneous connections for the one or more slices with both the source cell and the target cell for enhanced handovers of the one or more slices; and means, for one or more other network slices to be handed over for the user equipment from the source cell to the target cell, for not maintaining simultaneous connections for the one or more other network slices for normal handovers of those one or more other slices.

In a fourth aspect, there is provided a computer readable medium having a computer program stored thereon which, when executed by at least one processor of a device, causes the device to carry out the method according to the first aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

In the attached Drawing Figures:

FIGS. 3-19 are figures illustrating information and signaling diagrams that may be used with exemplary embodiments herein, where:

FIG. 3 illustrates a format of S-NSSAI;

FIG. 4 illustrates a signaling diagram of a handover preparation procedure;

FIG. 5 is a table illustrating configuration of a HANDOVER REQUEST message;

FIG. 5A is a table illustrating configuration of a PDU Session Resources To Be Setup List IE from FIG. 5;

FIG. 6 is an illustration of configuration of a HandoverPreparationInformation message;

FIG. 7 is a table illustrating configuration of a HANDOVER REQUEST ACKNOWLEDGE message;

FIG. 7A is a table illustrating configuration of a PDU Session Resources Admitted List IE from FIG. 7;

FIG. 7B is a table illustrating configuration of a PDU Session Resources Not Admitted List IE from FIG. 7;

FIG. 8 is an illustration of configuration of an RRC Connection Reconfiguration message with mobility control information/Handover Command;

FIG. 9 is an illustration of configuration of MobilityControlInfo information element;

FIG. 10 is a signaling diagram of Handover Preparation with successful operation via a core network based HO and the NG interface;

FIG. 11 is a signaling diagram of Handover Resource Allocation with successful operation via a core network based HO and the NG interface;

FIG. 12 is a table illustrating configuration of a HANDOVER REQUIRED message of FIG. 10;

FIG. 13 is a table illustrating configuration of a HANDOVER COMMAND message of FIG. 10;

FIG. 14 is a table illustrating configuration of a HANDOVER REQUEST message of FIG. 11;

FIG. 15 is a table illustrating configuration of a HANDOVER REQUEST ACKNOWLEDGE message of FIG. 11;

FIG. 16 is a table illustrating configuration of a Target to Source Transparent Container IE;

FIG. 17 is a table illustrating configuration of a Target NG-RAN Node to Source NG-RAN Node Transparent Container IE;

FIG. 18 is a table illustrating configuration of a Source to Target Transparent Container IE;

FIG. 19 is a table illustrating configuration of a Source NG-RAN Node to Target NG-RAN Node Transparent Container IE;

FIG. 20A is an example of block 2010 from FIG. 20;

FIG. 20B is an example of possible indications in a HO request message from FIG. 20;

FIG. 20C is an example of possible indications in a HO request acknowledgement (Ack) message from FIG. 20;

FIG. 20D is an example of possible indications in a HO command message from FIG. 20.

DETAILED DESCRIPTION OF THE DRAWINGS

Figure 1:
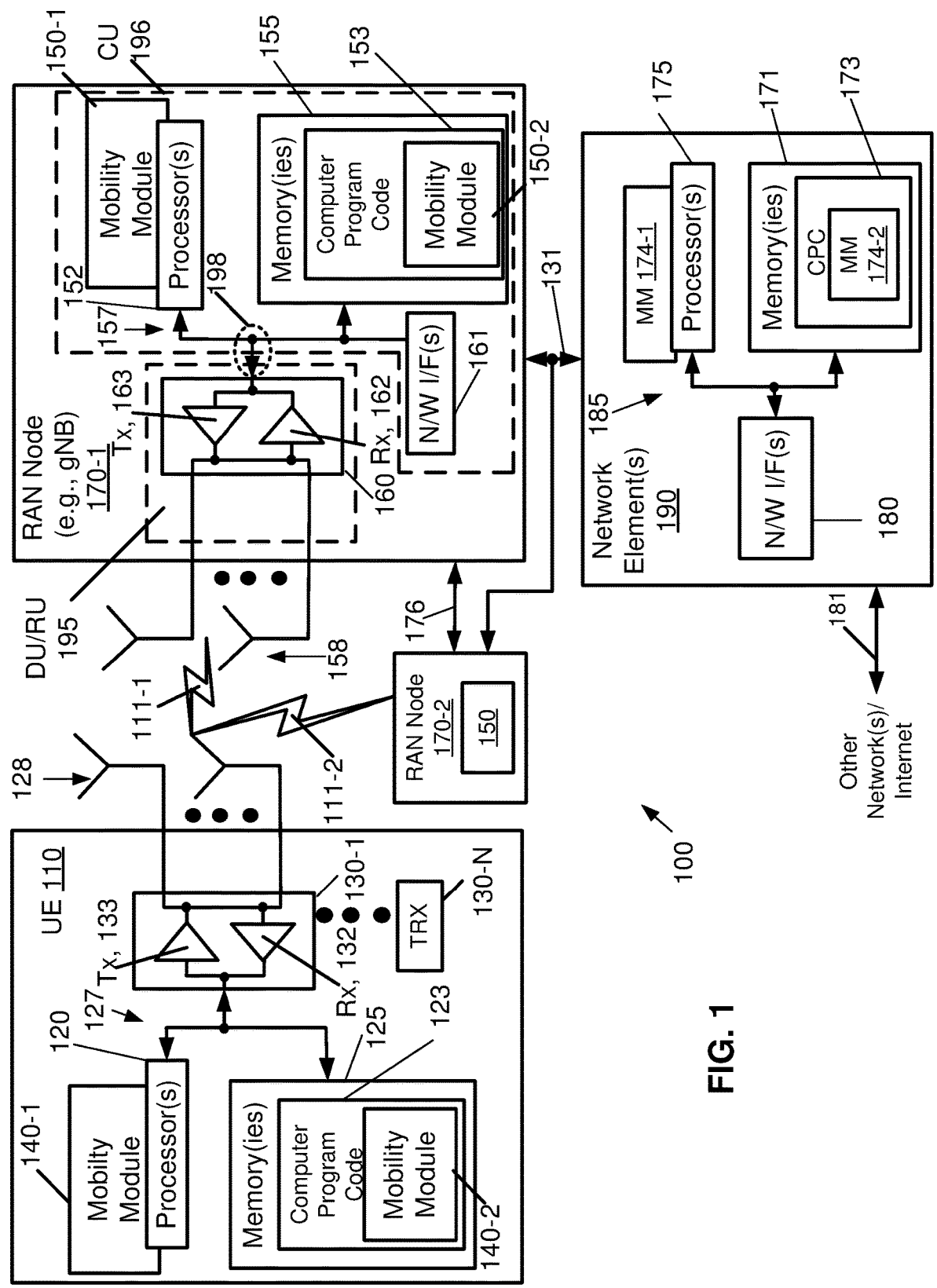
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
Ack acknowledgement
AMF access and mobility management function
ARQ Automatic Repeat Request
BS base station
CPC computer program code
CU central unit
DRB Data Radio Bearer
DU distributed unit
eMBB enhanced Mobile Broadband
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HARQ Hybrid Automatic Repeat Request
HO handover
ID identification
IE information element
I/F interface
LTE long term evolution
MAC medium access control
MM mobility module
MME mobility management entity
ng or NG new generation
ng-eNB or NG-eNB new generation eNB
NR new radio
N/W or NW network
PCell primary cell
PDCP packet data convergence protocol
PDU Protocol Data Unit
PHY physical layer
PRACH physical random access channel
PUSCH physical uplink shared channel
RAN radio access network
Rel release
RF radio frequency RLC radio link control
RRH remote radio head
RRC radio resource control
RU radio unit
Rx receiver
SDAP service data adaptation protocol
SGW serving gateway
SMF session management function
SN Sequence Number
S-NSSAI Single-Network Slice Selection Assistance Information
SST Slice Service Type
TRX transceiver
TS technical specification
Tx transmitter
UE user equipment (e.g., a wireless, typically mobile device)
UL uplink
UPF user plane function
URLLC Ultra-Reliable Low Latency Communication
WI work item The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for enhanced mobility in cellular deployments with network slicing. Additional description of these techniques is presented after a system into which the exemplary embodiments may be used is described. For ease of reference, this disclosure is divided into sections.

I. EXEMPLARY SYSTEM

Turning to FIG. 1, this figure shows a block diagram of one possible and non-limiting exemplary system in which the exemplary embodiments may be practiced. A user equipment (UE) 110, radio access network (RAN) nodes 170-1 and 170-2, and network element (or elements) 190 are illustrated. In FIG. 1, a user equipment (UE) 110 is in wireless communication with a wireless network 100. The wireless network 100 is a cellular network. A UE is a wireless, typically mobile device that can access a wireless network. The UE 110 includes one or more processors 120, one or more memories 125, and one or more transceivers (TRXs) 130 interconnected through one or more buses 127. In this case, there are N transceivers 130-1 through 130-N, where N is, e.g., typically two, though N is not limited to two. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a mobility module 140, comprising one of or both parts 140-1 and/or 140-2, which may be implemented in a number of ways. The mobility module 140 may be implemented in hardware as mobility module 140-1, such as being implemented as part of the one or more processors 120. The mobility module 140-1 may be implemented also as an integrated circuit or through other hardware such as a programmable gate array. In another example, the mobility module 140 may be implemented as mobility module 140-2, which is implemented as computer program code 123 and is executed by the one or more processors 120. The one or more memories 125 and the computer program code 123 may be configured to, with the one or more processors 120, cause the user equipment 110 to perform one or more of the operations as described herein. The UE 110 communicates with RAN node 170-1 via a wireless link 111-1 and communicates with RAN node 170-1 via wireless link 111-2.

The RAN nodes 170-1 and 170-2 are base stations that provide access by wireless devices such as the UE 110 to the wireless, cellular network 100. For simplicity, only an exemplary implementation of RAN node 170-1 will be described, and it is assumed that RAN node 170-2 is similar. The RAN node 170-1 may be, for instance, a base station for 5G, also called New Radio (NR). In 5G, the RAN node 170-1 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170-1 and centralized elements of the RAN node 170-1, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170-1 may also be an eNB (evolved NodeB) base station, for LTE (long term evolution), or any other suitable base station.

The RAN node 170-1 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170-1 (and 170-2) includes a mobility module 150, comprising one of or both parts 150-1 and/or 150-2, which may be implemented in a number of ways. The mobility module 150 may be implemented in hardware as mobility module 150-1, such as being implemented as part of the one or more processors 152. The mobility module 150-1 may be implemented also as an integrated circuit or through other hardware such as a programmable gate array. In another example, the mobility module 150 may be implemented as mobility module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the mobility module 150 may be distributed, such as being distributed between the DU 195 and the CU 196, or be implemented solely either in the DU 195 or the CU 196.

The one or more network interfaces 161 communicate over a network such as via the links 176 and 131. Two or more RAN nodes 170 (such as RAN nodes 170-1, 170-2) communicate using, e.g., link 176. The link 176 may be wired or wireless or both and may implement, e.g., an Xn interface for 5G, an X2 interface for LTE, or other suitable interface for other standards. The one or more buses 157 may be address, data, or control buses, and may include any interconnection mechanism, such as a series of lines on a motherboard or integrated circuit, fiber optics or other optical communication equipment, wireless channels, and the like.

The wireless, cellular network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN nodes 170 are coupled via links 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. There is a mobility module (MM) 174, which may be implemented as hardware (illustrated by MM 174-1) in circuitry or by software (illustrated by MM 174-2 in the computer program code 174), or both. The one or more memories 171 include computer program code (CPC) 173, which includes a mobility module (MM) 174-2 in some applications. The one or more memories 171 and the computer program code 173 are configured to, with the one or more processors 175, cause the network element 190 to perform one or more operations described herein.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells. In the examples below, a source RAN node 170-1 or target RAN node 170-2 may be referred to as cells, since one typical application is a handover from a cell of a source RAN node 170-1 to a cell of a target RAN node 170-2.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN nodes 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

II. ADDITIONAL INFORMATION FOR CONTEXT AND FOR EXEMPLARY EMBODIMENTS

For generality, we use the expression "enhanced HO" to refer to any handover method that seeks to achieve 0ms or close to 0 ms interruption by leveraging the existence of the two TRXs 130 at the UE side, the ability for the UE to communicate simultaneously to source and target BSs, and/or for the UE to exchange (e.g., transmit and receive) user and control data with the source BS after the source BS has sent the HO command to the UE and the UE has received the command In general we refer to any scheme reducing the interruption time in comparison to what can be achieved with legacy mechanisms. The genuine "0 ms" can be achieved only when a sort of "multi-connectivity" is employed. "Close to 0 ms" implies that we reduce the interruption to few milliseconds, the time needed, e.g., to retune the RF and the like but without the need to support necessarily multiple links simultaneously (i.e., true 0 ms).

Certain embodiments herein concern the new Rel-16 enhanced handover in a cellular deployment with network slicing. In the following, we provide an overview of the non-split bearer techniques discussed in R2-1817691, Non-split bearer solution for reducing the service interruption time in HO, 3GPP TSG-RAN WG2 Meeting #104, Spokane, US, 12-16 Nov. 2018, as one exemplary implementation for enhanced HO in Rel. 16. However, this does not limit the applicability of the techniques herein to any enhanced mobility solution as discussed above.

II.A. Non-Split Bearer Legacy Techniques for Reducing Service Interruption Time During HO for LTE/NR Rel. 16

These techniques build on top of a baseline HO where the source BS (e.g., RAN node 170-1) and UE 110 continue the radio communication after the transmission of the HO command The connection between the source BS and UE 110 is released after the UE can send or has received Packet Data Convergence Protocol (PDCP) packets from the target BS (e.g., RAN node 170-2).

The proposed techniques also build on top of the make-before-break solution which was standardized in Rel-14. See: 3GPP TS 36.300 V14.8.0 (2018-09), Overall description; Stage 2 (Release 14). However, this legacy set of techniques assumes only a single transceiver (TRX) at the UE side and this limitation leaves a residual HO interruption of ~5 ms (about 5 milliseconds). These techniques shall go beyond the Rel-14 solution, e.g., by assuming two TRXs.

Figure 2:
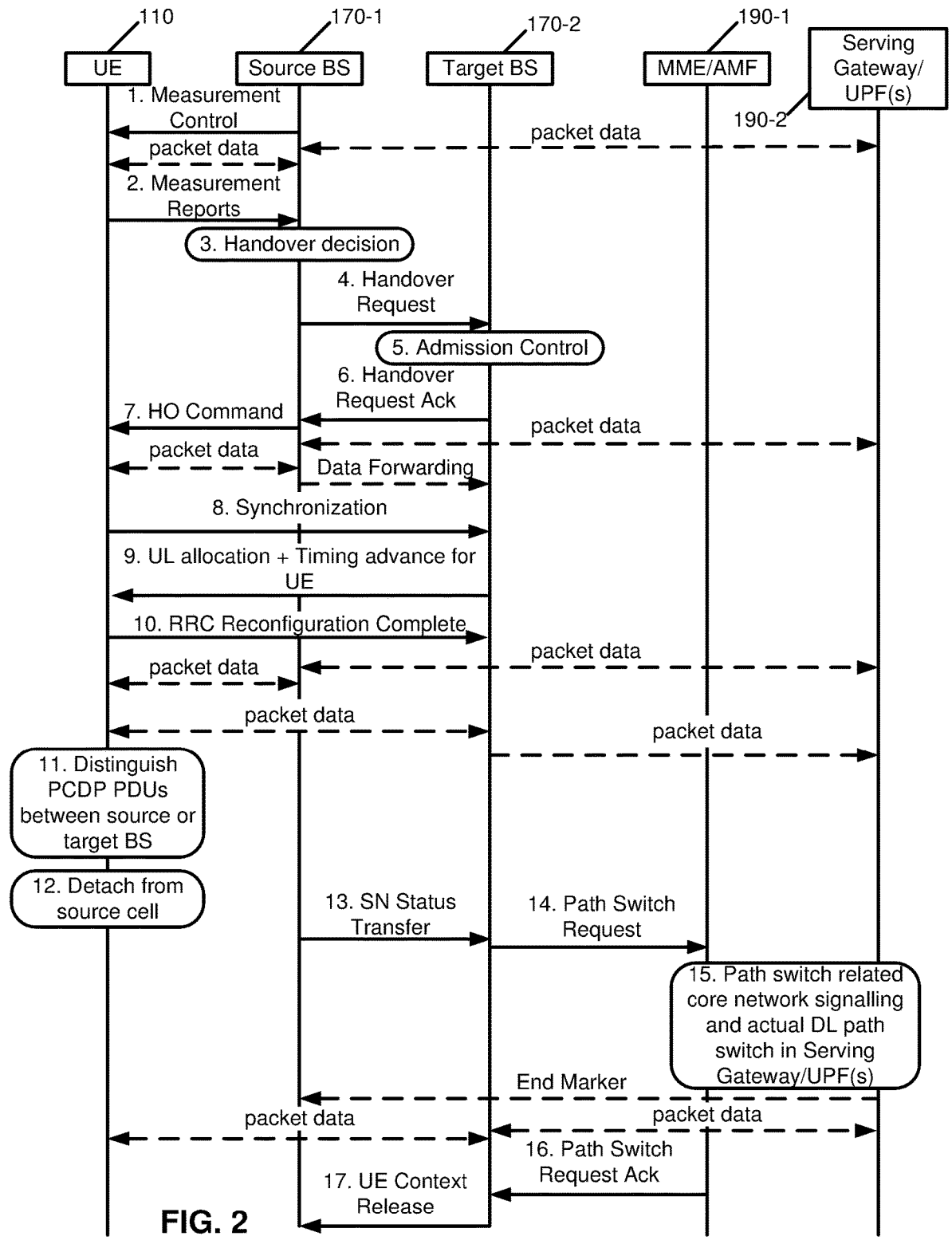
FIG. 2 is a signaling diagram illustrating 0 ms (zero milliseconds) interruption time using a non-split bearer technique.

For clarity, FIG. 2 shows one exemplary implementation of the non-split bearer techniques. In particular, FIG. 2 is a signaling diagram illustrating 0 ms (zero milliseconds) interruption time using a non-split bearer technique. The entities involved are the UE 110, a source BS 170-1, a target BS 170-2, an MME/AMF 190-1 and a serving gateway/UPF(s) 190-2. For ease of reference, the RAN nodes 170 are referred to as BSs herein.

Steps 1-6 are the same as in a baseline HO described in 3GPP TS 38.300 V15.4.0 (2018-12), Overall description; Stage 2 (Release 15). Step 1 is a measurement control signaling, followed by packet data communication. Step 2 is a signaling of measurement reports, and step 3 is a handover decision. Step 4 is a handover request, step 5 is an admission control method, and step 6 is a handover request Ack (acknowledgement). The Handover Request message in step 4 includes an indication for make-before-break from source cell to the target cell. The target BS 170-2 prepares the HO command according to that indication from the source cell.

In step 7, the handover (HO) command sent by the source BS 170-1 can contain an indication of (e.g., enhanced) make-before-break to inform the UE that the source BS 170-1 will continue the transmission/reception of PDCP Protocol Data Units (PDUs). After the HO command, there are two packet data signaling sessions.

The UE 110 performs access to the target cell in steps 8-10 while receiving and transmitting PDCP Protocol PDUs from and to the source BS 170-1. Step 8 involves synchronization signaling, step 9 involves UL allocation and timing advance for the UE, and step 10 involves RRC Reconfiguration Complete signaling. There are four sessions of packet data signaling after step 10. After step 10, the UE 110 distinguishes the PDCP PDUs between source and target BSs that can be ciphered using different security keys. See step 11.

Having received or being able to receive PDCP PDUs from target BS 170-2, the UE detaches from the source BS 170-1. See step 12.

It is up to network implementation when the source BS 170-1 sends Sequence Number (SN) Status Transfer message in step 13 to the target BS 170-2, e.g., upon detecting a missing Medium Access Control (MAC) Hybrid Automatic Repeat Request (HARQ)/or Radio Link Control (RLC) Automatic Repeat Request (ARQ) feedback. For lossless HO, the SN Status Transfer message in step 13 provides the Sequence Numbers (SNs) of next missing downlink and uplink packets that the target BS shall transmit or receive.

A path switch from source BS to target BS is executed and completed in steps 14-17. In step 14, a Path Switch Request signaling is performed, and in step 15, a path switch related core network internal signaling and actual DL switch is performed in the serving gateway/UPF(s) 190-2. This is followed by an end marker routing, then two packet data sessions between the UE and target BS and between target BS and serving gateway/UPF(s). In step 16, there is a Path Switch Request Ack signaling and in step 17, a UE Context Release message.

It is noted that the hardware and RF design of the UE should allow simultaneous transmission and reception ("two TRXs") to two intra-frequency/inter-frequency cells. While the techniques of FIG. 2 are useful, these could still be improved, particularly for network slicing implementations.

II.B. Network Slicing

Network slicing is a key 5G feature to support different services using the same underlying mobile network infrastructure. See: 3GPP TS 23.501 V15.4.0 (2018-12), System Architecture for the 5G system (Release 15). This technical standard defines a network slice as the following: "A logical network that provides specific network capabilities and network characteristics." A network slice instance is defined as the following: "A set of Network Function instances and the required resources (e.g. compute, storage and networking resources) which form a deployed Network Slice".

Network slices can differ either in their service requirements like Ultra-Reliable Low Latency Communication (URLLC) and enhanced Mobile Broadband (eMBB), or in the tenant that provides those services. 3GPP TS 23.501, section 5.15.1, states the following: "Network slices may differ for supported features and network functions optimisations, in which case such Network Slices may have e.g. different S-NSSAIs with different Slice/Service Types (see clause 5.15.2.1)." From a network management perspective, different network slices can also have different key performance indicator targets and optimization goals. For example, for a URLLC service, any kind of HO failures, outages, and service interruption would be critical and should be avoided as much as possible. However, for an eMBB service, HO failures and service interruption would be relatively less critical than in URLLC, and therefore the eMBB service has more relaxed requirements.

A network slice is identified via the S-NSSAI (Single-Network Slice Selection Assistance Information). According to 3GPP TS 23.501, section 5.15.2.1: "An S-NSSAI is comprised of: A Slice/Service type (SST), which refers to the expected Network Slice behaviour in terms of features and services; A Slice Differentiator (SD), which is optional information that complements the Slice/Service type(s) to differentiate amongst multiple Network Slices of the same Slice/Service type." Current 3GPP specifications (see 3GPP TS 23.501) allow a UE to be simultaneously connected and served by at most eight S-NSSAIs. On other hand, there is no limit on the number of network slices that each cell may support: The cell may support tens or even hundreds of S-NSSAIs.

The S-NSSAI may include both Slice Service Type (SST) and Slice Differentiator (SD) field with a total length of 32 bits or include only SST field part in which case the length of S-NSSAI is 8 bits only, see FIG. 3.

The SST field may have standardized and non-standardized values. Values 0 (zero) to 127 belong to the standardized SST range and they are defined in 3GPP TS 23.501. For instance, an SST value of 1 (one) may indicate that the slice is suitable for handling of 5G eMBB, 2 (two) for handling of URLLC, and the like. SD is operator-defined only.

II.C. Possible Issues with Legacy Techniques

Current LTE Rel. 14 specification support for make-before-break handover is slice agnostic and is not sufficient for mobile network deployments with network slicing due to the following problems.

Rel-14 signaling (as described also below) from source cell to target cell for handover preparation uses RRC Context IE to indicate the need for make-before-break handover for a UE. In scenarios, where a UE 110 is connected to multiple slices at the time of a handover request, the current signaling is ambiguous in the sense that one cannot tell whether make-before-break handover will be applicable to all the connected slices or not. The connected slices are those slices with which the UE is actively exchanging user data and/or control data.

The enhanced HO discussed for Rel. 16 may require that the source cell continues to transfer data to the UE even after the HO command is sent to the UE, i.e., from step 7 until step 12 in FIG. 2. As such, the number of configured Data Radio Bearers (DRBs) for each PDU session (pertaining possibly to a network slice) has to be doubled as the UE needs to exchange user data simultaneously with source and target BS, i.e., after step 10 in FIG. 2. Therefore, for efficient resource utilization, it is important that the enhanced HO is used only for the services/slices that really need such a feature. The make-before-break indication in the HO request message of Rel. 14 (which may be replaced by new indication for enhanced HO in Rel. 16) from the source cell to target cell needs to be made flexible so that the source cell can freely choose for which services/slices the cell wants to support the enhanced HO even for the same UE.

The source cell might want to support the enhanced HO only for a subset of services/slices currently used by the UE due to following reasons.

(1) To avoid overload on its radio resources, as cell edge users (performing HO and still receiving user data packets from the source BS after receiving the HO command) usually need more resources due to lower SINR at the UE.

(2) To prioritize the services/slices that absolutely need 0 ms (zero ms) or close to 0 ms (zero ms) interruption time, in case the source cell cannot support the enhanced HO for all the services/slices due to radio/X2/Xn resource constraints. Note that the UE can support simultaneously up to eight network slices.

(3) To optionally support enhanced HO even for a service/slice that does not need 0 ms (zero ms) or close to 0 ms (zero ms) interruption time but the cell offers the enhanced HO as a performance enhancement optimization when the cell has the resources for the enhanced HO.

One problem with current specifications for make-before-break (Rel. 14) is that these are very rigid and do not allow the source cell to apply different policies for different simultaneously connected services/slices of a UE based on the cell's resource utilization and optimization goals.

III. OVERVIEW AND SUPPORT FOR THE ENHANCED HO OF THE EXEMPLARY EMBODIMENTS

In the following, we capture the 3GPP specifications of LTE Rel. 14 and NR that are relevant for supporting the enhanced HO of the exemplary embodiments in the context of network slicing. For simplification, the text below does not show the full messages but only the parts that are relevant for the network slicing aspects.

III.A. RAN-Based HO (Xn/X2 Interface)

The handover preparation procedure, which is described in 3GPP TS 38.423 V15.2.0 (2018-12), NG-RAN; Xn Application Protocol (XnAP) (Release 15) is shown in FIG. 4. There is a source NG-RAN node 170-1 and a target NG-RAN node 170-2, a handover request message from the source RAN node 170-1 to the target RAN node 170-2, and a handover request acknowledge message from the target RAN node 170-2 to the source RAN node 170-1.

The HANDOVER REQUEST message is defined in 3GPP TS 38.423 V15.1.0, Section 9.1.1.1, and this message is sent by the source NG-RAN node to the target NG-RAN node to request the preparation of resources for a handover. The HANDOVER REQUEST message is shown in FIG. 5. The columns are as follows: the IE (information element) name is shown in the leftmost column; this is followed by the presence (e.g., M for mandatory or O for optional); the range, which may include an indication of how many values there might be; the IE type and reference, where the reference is to another section of the TS and the IE type can be, e.g., OCTET STRING; semantics description, which can provide a description of the semantics; criticality, which indicates whether the item is critical for operation; and assigned criticality.

In this example, the IE of PDU session resources to be setup list 510 and the RRC context 520 are entries that might be used to convey information in exemplary embodiments herein, as described below. The semantics description of the PDU session resources to be setup list 510 is the following: "Similar to NG-C signalling, containing UL tunnel information per PDU Session Resource; and in addition, the source side QoS flow⇔DRB mapping". The semantics description of the RRC context 520 is the following: "Either includes the HandoverPreparationInformation message as defined in subclause 10.2.2. of TS 36.331 [14], if the target NG-RAN node is an ng-eNB, or the HandoverPreparationInformation message as defined in subclause 11.2.2 of TS 38.331 [9], if the target NG-RAN node is a gNB."

FIG. 5A is a table illustrating configuration of a PDU Session Resources To Be Setup List IE 510 from FIG. 5. This IE contains PDU session resource related information used at UE context transfer between NG-RAN nodes. This IE 510 has a PDU session Resources To Be Setup Item 540, which may be used in certain exemplary embodiments here, as described below. See, e.g., 3GPP TS 38.423 V15.2.0 (2018-12), NG-RAN; Xn Application Protocol (XnAP) (Release 15).

The HandoverPreparationInformation message in the RRC Context 520 is defined in 3GPP TS 36.331 V15.1.0 Section 10.2.2 and is illustrated in FIG. 6. This message is used to transfer the E-UTRA RRC information used by the target eNB during handover preparation, including UE capability information. The direction is from source eNB/source RAN node to a target eNB/target RAN node. The makeBeforeBreakReq-r14 610 is a variable that might be used in the techniques described herein.

Turning to the HANDOVER REQUEST ACKNOWLEDGE message of FIG. 4, this is described in 3GPP TS 38.423 V15.0.0 Section 9.1.1.2. FIG. 7 is a table illustrating contents of a HANDOVER REQUEST ACKNOWLEDGE message. This message is sent by the target NG-RAN node 170-2 to the source NG-RAN node 170-1 to inform the source NG-RAN node 170-1 about the prepared resources at the target. The following are options available for use with exemplary embodiments herein: PDU Session Resources Admitted List 710; PDU Session Resources Not Admitted List 720; and Target NG-RAN node To Source NG-RAN node Transparent Container 730. FIG. 7A is a table illustrating configuration of a PDU Session Resources Admitted List IE 710 from FIG. 7. This IE contains PDU session resource related information to report success of the establishment of PDU session resources. FIG. 7B is a table illustrating configuration of a PDU Session Resources Not Admitted List IE 720 from FIG. 7. This IE contains a list of PDU session resources which were not admitted to be added or modified. See, e.g., 3GPP TS 38.423 V15.2.0 (2018-12), NG-RAN; Xn Application Protocol (XnAP) (Release 15) for at least FIGS. 7A and 7B. These messages might be used in exemplary embodiments herein.

Another message that might be used herein is the RRC Connection Reconfiguration message with mobility control information/Handover Command (TS 36.331). This message is shown in FIG. 8. The variable MobilityControlInfo might be used in an exemplary embodiment herein.

FIG. 9 is an illustration of a MobilityControlInfo information element. The makeBeforeBreak-r14 variable 910 of the MobilityControlInfo IE and/or the makeBeforeBreakSCG-r14 variable 920 of the MobilityControlInfoSCG-r12 IE might be used in exemplary embodiments herein. The makeBeforeBreak 910 indicates that the UE shall continue uplink transmission/downlink reception with the source cell(s) before performing the first transmission through PRACH to the target intra-frequency PCell, or performing initial PUSCH transmission to the target intra-frequency PCell while rach-Skip is configured. The makeBeforeBreakSCG 920 indicates that the UE shall continue uplink transmission/downlink reception with the source cell(s) before performing the first transmission through PRACH to the target intra-frequency PSCell, or performing initial PUSCH transmission to the target intra-frequency PSCell while rach-SkipSCG is configured.

III.B. Core Network Based HO (NG Interface)

Handover between cells belonging to NG-RAN nodes 170 that are not direct neighbors (do not have an Xn interface between them) is also supported via the core network using the NG interface between the NG-RAN node and AMF, as described in 3GPP TS 38.413 V15.1.0 (2018-09), NG-RAN; NG Application Protocol (NGAP) (Release 15). The relevant details are given below.

Handover Preparation is described in 3GPP TS 38.413 V15.1.0, Section 8.4.1, and FIG. 10 is a signaling diagram of Handover Preparation with successful operation via a core network based HO and the NG interface. FIG. 10 shows signaling between a source NG-RAN node 170-1 and an AMF 190-1.

Section 8.4.2 of TS 38.413 describes Handover Resource Allocation, and FIG. 11 is a signaling diagram of Handover Resource Allocation with successful operation via a core network based HO and the NG interface. FIG. 11 shows signaling between a target NG-RAN node 170-2 and an AMF 190-1.

The HANDOVER REQUIRED message is described in 3GPP TS 38.413 V15.1.0, Section 9.2.3.1. This message is sent by the source NG-RAN node to the AMF and illustrated by the table in FIG. 12. The PDU Session Resource Item 1210, PDU Session ID IE 1220, and/or the Source to Target Transparent Container 1230 might be used in exemplary embodiments herein.

The HANDOVER COMMAND message is described in 3GPP TS 38.413 V15.1.0, Section 9.2.3.2, and is sent by the AMF 190-1 to inform the source NG-RAN node 170-1 that resources for the handover have been prepared at the target side. FIG. 13 is a table illustrating contents of a HANDOVER COMMAND message of FIG. 10. The PDU Session Resource Handover Item group 1310, which includes the PDU Session ID IE 1320, and the Target to Source Transparent Container IE 1330 may be used in exemplary embodiments described below. In this message, this IE would be what is shown in FIG. 16. However, as given in the semantics description of FIG. 16, this IE just carries the Target NG-RAN Node to Source NG-RAN Node Transparent Container as given in FIG. 7 as reference 730. So the contents would be same, but the IE name is different.

The HANDOVER REQUEST message of FIG. 11 is described in 3GPP TS 38.413 V15.1.0, Section 9.2.3.4. This message is sent by the AMF 190-1 to the target NG-RAN node 170-2 to request the preparation of resources. FIG. 14 is a table illustrating contents of a HANDOVER REQUEST message of FIG. 11. The PDU Session Resource Setup Item group 1410, which includes a PDU Session ID IE 1420 and an S-NSSAI IE 1430, may be used in certain exemplary embodiments described below. Additionally, the Source to Target Transparent Container IE 1440 may be used in certain exemplary embodiments described below.

The HANDOVER REQUEST ACKNOWLEDGE message is described in 3GPP TS 38.413 V15.1.0, Section 9.2.3.5, and is illustrated in FIG. 11 as being a response from the target NG-RAN node 170-2 to the AMF 190-1. This message is sent by the target NG-RAN node 170-2 to inform the AMF 190-1 about the prepared resources at the target. FIG. 15 is a table illustrating contents of a HANDOVER REQUEST ACKNOWLEDGE message of FIG. 11. The PDU Session Resource Admitted Item group 1510, which includes a PDU Session ID IE 1520 and a Handover Request Acknowledge Transfer IE 1530, may be used in certain exemplary embodiments described below. Additionally, the Source to Target Transparent Container IE 1540 may be used in certain exemplary embodiments described below.

There is a Target to Source Transparent Container IE described in 3GPP TS 38.413 V15.1.0, Section 9.3.1.21, which might be used herein in one or more exemplary embodiments. This IE is used to transparently pass radio related information from the handover target to the handover source through the core network; it is produced by the target RAN node and is transmitted to the source RAN node. A table illustrating configuration of the Target to Source Transparent Container IE is shown in FIG. 16. The semantics description for this IE is as follows: "This IE includes a transparent container from the target RAN node to the source RAN node. The octets of the OCTET STRING are encoded according to the specifications of the target system. Note: In the current version of the specification, this IE may carry either the Target NG-RAN Node to Source NG-RAN Node Transparent Container IE or the Target eNB to Source eNB Transparent Container IE as defined in TS 36.413 [16]."

There is also a Target NG-RAN Node to Source NG-RAN Node Transparent Container IE, described in 3GPP TS 38.413 V15.1.0, Section 9.3.1.30. This IE might be used in exemplary embodiments. This IE is produced by the target NG-RAN node and is transmitted to the source NG-RAN node. For inter-system handovers to 5G, the IE is transmitted from the target NG-RAN node to the external relocation source. This IE is transparent to the 5GC.

FIG. 17 is a table illustrating configuration of a Target NG-RAN Node to Source NG-RAN Node Transparent Container IE. The semantics description for this IE is as follows: "Includes the RRC HandoverCommand message as defined in TS 38.331 [18] if the target is a gNB. Includes the RRC HandoverCommand message as defined in TS 36.331 [21] if the target is an ng-eNB."

Another IE that might be used in an exemplary embodiment is a Source to Target Transparent Container IE, described in 3GPP TS 38.413 V15.1.0, Section 9.3.1.2. This IE is used to transparently pass radio related information from the handover source to the handover target through the core network. This IE is produced by the source RAN node 170-1 and is transmitted to the target RAN node 170-2. FIG. 18 is a table illustrating configuration of a Source to Target Transparent Container IE. The semantics description for this IE states the following: "This IE includes a transparent container from the source RAN node to the target RAN node. The octets of the OCTET STRING are encoded according to the specifications of the target system. Note: In the current version of the specification, this IE may carry either the Source NG-RAN Node to Target NG-RAN Node Transparent Container IE or the Source eNB to Target eNB Transparent Container IE as defined in TS 36.413 [16]."

A further IE that might be used in exemplary embodiments is a Source NG-RAN Node to Target NG-RAN Node Transparent Container IE, described in 3GPP TS 38.413 V15.1.0, Section 9.3.1.29. This IE is produced by the source NG-RAN node 170-1 and is transmitted to the target NG-RAN node 170-2. For inter-system handovers to 5G, the IE is transmitted from the external handover source to the target NG-RAN node. This IE is transparent to the 5GC. FIG. 19 is a table illustrating configuration of a Source NG-RAN Node to Target NG-RAN Node Transparent Container IE. The RRC Container IE 1910 and also the RRC Handover-Command message as defined in TS 38.331 (see reference 1920) may be used in exemplary embodiments herein.

IV. OVERVIEW OF EXEMPLARY EMBODIMENTS

An exemplary embodiment proposes that the source cell provides a service/slice specific indication for enhanced HO (similar to make-before-break indication of LTE Rel. 14) to the target cell in the HO preparation phase. The target cell can then prepare a HO command that considers the service/slice specific request from the source cell. This HO command is then delivered to the UE, via the source cell, to inform the UE for which services/slices the UE needs to maintain the connection to both the source cell and target cell during the HO and for which services/slices the UE can perform the normal HO and does not need to maintain two simultaneous connections.

This would allow the source cell to choose for which services/slices the source cell wants to support the enhanced HO depending on its resource utilization status and the service characteristics of different slices the UE is connected to (e.g., the tolerance for user service interruption per particular service).

Figure 20:
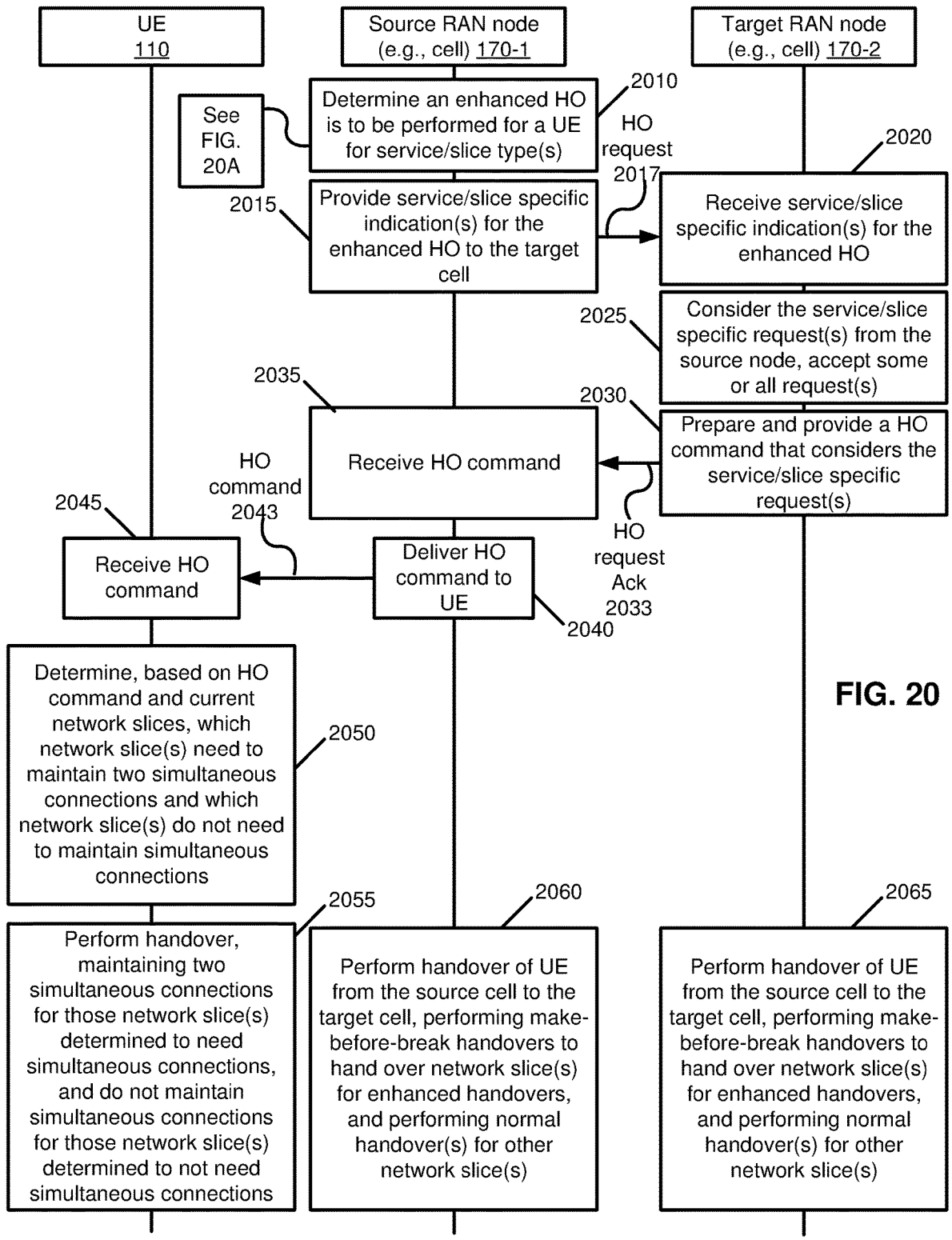
FIG. 20 is a logic flow diagram and signaling diagram for enhanced mobility in cellular deployments with network slicing, and illustrates a RAN-based handover, in accordance with an exemplary embodiment.

Referring to FIG. 20, this figure is a logic flow diagram and signaling for enhanced mobility in cellular deployments with network slicing, and illustrates a RAN-based handover. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 20 are assumed to be performed by the UE 110, under control of the mobility module 140, and the source and target RAN nodes 170-1, 170-2, under control of corresponding mobility modules 150. Each of the source RAN node 170-1 and the target RAN node 170-2 forms a corresponding cell described in this figure (and also FIG. 21), and may also form other cells. Note that intra-gNB handover is also possible. That is, handover between cells of a RAN node 170 (e.g., the source and target RAN nodes are the same, but different cells). But in this case there will be no message exchange on the standardized interfaces. Instead, the exchange is internal to the gNB.

In block 2010, the source RAN node 170-1 determines an enhanced HO is to be performed for a UE for one or more service/slice types. That is, it is the source cell (e.g., formed by the source RAN node 170-1) that decides for which slices the cell wants to have make-before-break, so the optimization logic is with the source cell. The target cell (e.g., formed by the target RAN node 170-2) just follows the request from the source cell. The source RAN node 170-1 makes this determination in block 2010. FIG. 20A is an example of block 2010 from FIG. 20. FIG. 20A shows the source RAN node 170-1 performing the operation of choosing for which services/slices the source cell (formed by the source RAN node 170-1) wants to support the enhanced HO, depending on the resource utilization status of the source RAN node 170-1 and the service characteristics of different slices to which the UE is connected (e.g., the tolerance for user service interruption per particular service).

In block 2015, the source RAN node 170-1 provides (e.g., via a HO request message 2017) service/slice specific indication(s) for the enhanced HO to the target cell. Turning to FIG. 20B, this figure is an example of possible indications in a HO request message from FIG. 20. There is an indication in (A) of a list of slices to be handed over to the target cell. This is part of, e.g., the "PDU Session Resource To Be Setup List" (for example FIG. 5, reference 510). With this list, the target cell already knows all the slices/services that require a HO and the target RAN node 170-2 can accept or reject those slices individually. The HO request 2017 may also indicate (B) the type of HO to be performed for the individual slices. This needs to be communicated from source cell to the target cell in addition to the list above. Two possible examples are illustrated by FIG. 20B, where the source RAN node 170-1 can perform one of the following: 1.) Provide a full list of slices with their corresponding HO types, or 2.) Provide only the list of slices that require enhanced HO and the other slices are assumed to be handed over with normal HO. How to communicate this list is explained below. In short, as examples, one can either: (a) Modify the "makeBeforeBreakReq-r14" (FIG. 6) to be a list that contains the slice IDs and their required HO type, or (b) Add a new IE to indicate the required HO type in the "PDU Session Resources To Be Setup Item" (see item 540 of FIG.

5A). Returning to FIG. 20, the target RAN node 170-2 receives the service/slice specific indication(s) for the enhanced HO in block 2020.

In block 2025, the target RAN node 170-2 considers the service/slice specific request(s) from the source node. The target cell is free to accept or reject any HO requests depending, for example, on its resource utilization and supported features. In case of network slices, the target cell can accept all or only a subset of network slices that are requested by the source cell for a UE. But if the target cell accepts a HO request for a slice, the target cell will simply follow the instructions from the source cell about the type of HO to be performed for that slice. In block 2030, the target RAN node 170-2 prepares and provides a HO command that considers the service/slice specific request(s). The HO command is packaged in the HO request Acknowledge (Ack) message 2033. Referring to FIG. 20C, this figure is an example of possible indications in a HO request acknowledgement (Ack) message 2033 from FIG. 20. This example has the target RAN node 170-2 indicating in the HO request acknowledgement (Ack) message 2033 acceptance of or rejection of the provided slices, where the provided slices were given in option (1.) or (2.) of FIG. 20B. To clarify, the HO request acknowledgement message 2033 contains the acceptance or rejection indication at individual slice level. This means that the target RAN node 170-2 can possibly accept all or a subset (less than all) of the requested slices. The target RAN node 170-2 does not necessarily have to either accept or reject the whole HO request, although rejection of the whole HO request is possible (but is not shown in this figure or FIG. 20). In addition, the HO acknowledgement also contains the HO command message that defines the radio configuration to be used by the UE to perform the HO to the target cell including the type of HO information. See for example FIG. 7. Note that the HO request Ack 2033 can contain its own list, e.g., of slices and whether they were accepted or rejected.

In additional detail, regardless of HO type, the target cell needs to tell the source cell about which slices/PDU sessions the target cell can accept and which cannot be accepted. One option for this is given in FIG. 7 as "PDU Session Resources Admitted List" 710 (see FIG. 7A also), and "PDU Session Resources Not Admitted List" 720 (see FIG. 7B also). Assume the source cell indicates the following using the HO request 2017: Slice A, enhanced HO; Slice B, enhanced HO; Slice C, normal HO; and Slice D, normal HO. Assume the target cell accepts slices A, C, and D, but rejects slice B. In this case, the HO request Ack 2033 could indicate the following:

a. PDU Session Resources Admitted List 710: Slices A, C, D; and b. PDU Session Resources Not Admitted List 720: Slice B.

Now what is needed is to add the HO type indication. This we can add to both the accepted and rejected lists 710, 720, or only the accepted list 710.

The HO Request Ack 2033 also contains the "Target NG-RAN node To Source NG-RAN node Transparent Container" (see FIG. 7), which includes the HandoverCommand message to be forwarded to the UE. For this HandoverCommand message we have two options to indicate the HO type as described below:

a. Indicate the full list of slices to be handed over (see also (A.) of FIG. 20D, described below); and b. Indicate the type of HO either (1) for all accepted slices or (2) only for the accepted slices with enhanced HO. See (B.)(1.) and (B.)(2.) of block 20D, described below.

Returning to FIG. 20, the source RAN node 170-1 receives the HO command in block 2035 and in block 2040 delivers the HO command to the UE via (in this example) the HO command 2043. FIG. 20D is an example of possible indications in a HO command message 2043 from FIG. 20. The HO command message 2043 may indicate the following, e.g., the source RAN node 170-1 may: (A) Indicate a list of slices to be handed over to target cell; and (B) indicate the HO type as follows: 1.) Provide a full list of slices with their corresponding HO types, or 2.) Provide only the list of slices that require enhanced HO and the other slices are assumed to be handed over with normal HO.

In FIG. 20, the UE 110 in block 2045 receives the HO command 2043. In block 2050, the UE 110 determines, based on the HO command and current network slices, which network slice(s) (e.g., via service/slice type(s)) need to maintain two simultaneous connections (e.g., make-before-break handovers) and which network slice(s) (e.g., via service/slice type(s)) do not need to maintain simultaneous connections (e.g., legacy handovers). In respective blocks 2055, 2060, and 2065, the UE 110, the source RAN node 170-1, and the target RAN node 170-2 cooperate to perform handover of the UE from the source RAN node 170-1 to the target RAN node 170-2. Additionally, in block 2055, the UE 110 performs the handover, maintaining two simultaneous connections for those network slice(s) determined to need simultaneous connections, and does not maintain simultaneous connections for those network slice(s) determined to not need simultaneous connections. In block 2060, the source RAN node 170-1 performs handover of the UE 110 from the source cell to the target cell, performing make-before-break handovers to hand over network slice(s) for enhanced handovers, and performing normal handover(s) for other network slice(s). Similarly, in block 2065, the target RAN node 170-2 performs handover of the UE 110 from the source cell to the target cell, performing make-before-break handovers to hand over network slice(s) for enhanced handovers, and performing normal handover(s) for other network slice(s). As previously described, enhanced HO means the UE can simultaneously maintain connections to both the source and target cells after the UE has received the HO command For a normal handover, by contrast, the UE does not simultaneously maintain connections to both the source and target cells after the UE has received the HO command and instead breaks connection with the source cell before making a connection with the target cell.

Figure 21:
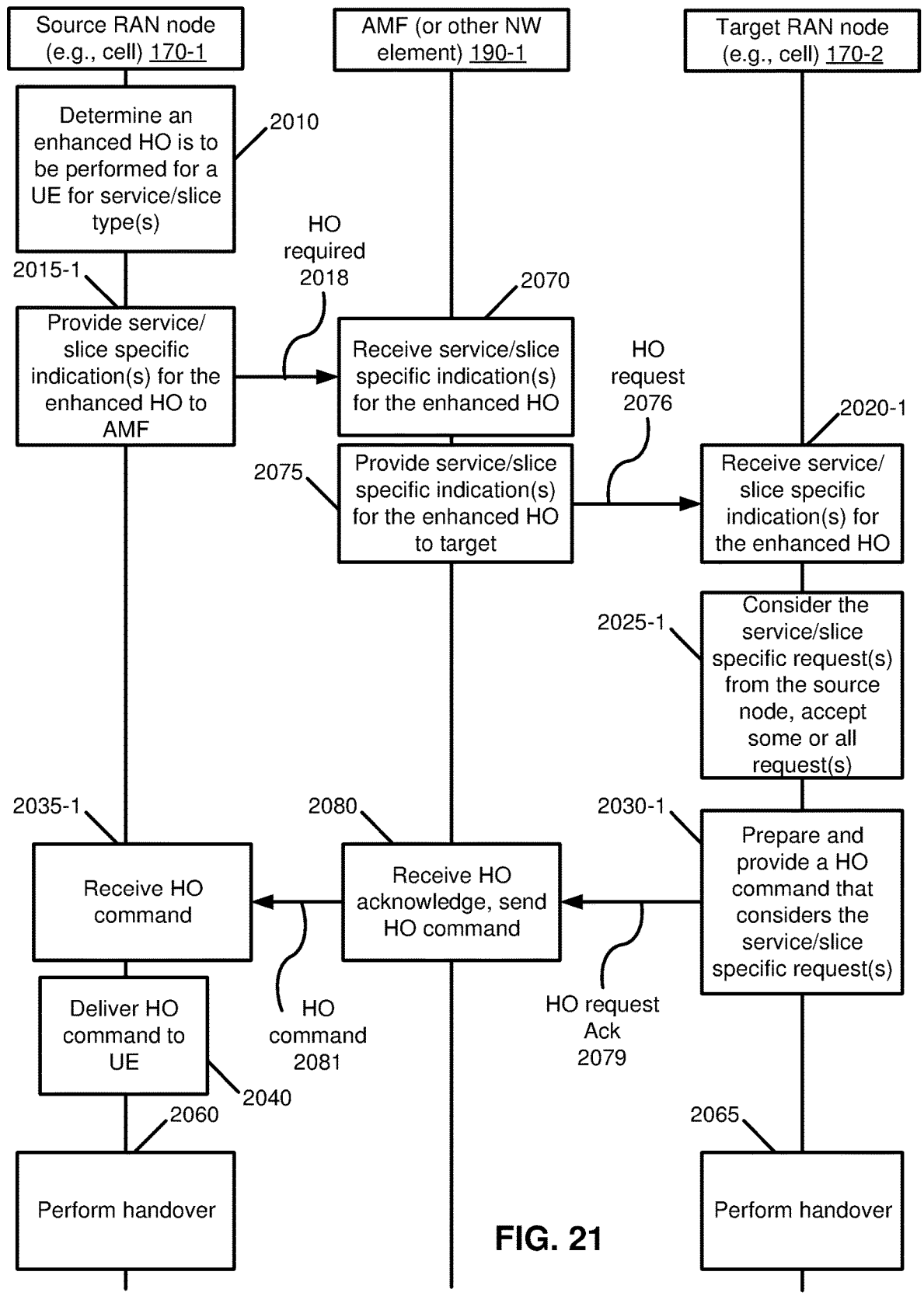
FIG. 21 is a logic flow diagram and signaling diagram for enhanced mobility in cellular deployments with network slicing, and illustrates a network-based handover, in accordance with an exemplary embodiment.

FIG. 21 is a logic flow diagram and signaling diagram for enhanced mobility in cellular deployments with network slicing, and illustrates a network-based handover, in accordance with an exemplary embodiment. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 21 are assumed to be performed by the source and target RAN nodes 170-1, 170-2, under control of corresponding mobility modules 150, and the AMF (and/or other network functionality, such as MME) 190-1, e.g., under control of the mobility module 174. This figure does not refer to the UE 110 for ease of reference, but the UE 110 would perform the actions in FIG. 20.

Block 2010 is the same as in FIG. 20. In block 2015-1, the source RAN node 170-1 provides service/slice specific indication(s) for the enhanced HO to the AMF 190-1. The source RAN node 170-1 uses the HO required message 2018, which is also illustrated in FIGS. 10 and 12. The AMF 190-1 is one example of a network element 190 that might be used in a core network, but other elements such as an MME could be used alternatively or in addition to the AMF 190-1. The AMF 190-1 receives the service/slice specific indication(s) for the enhanced HO in block 2070. The AMF 190-1 in block 2075 provides the service/slice specific indication(s) for the enhanced HO to the target (target RAN node 170-2), using the HO request message 2076. This message is shown in FIGS. 11 and 14.

The blocks 2020-1, 2025-1 and 2030-1 correspond to blocks 2020, 2025 and 2030 of FIG. 20, except that block 2020-1 receives the HO request message 2076 (e.g., instead of the HO request message 2017), the block 2025-1 uses this information (instead of the information from the HO request message 2017), and block 2030-1 sends a HO request acknowledgement (Ack) message 2079 (e.g., may be different from the HO request Ack message 2033). The HO request Ack message 2079 is also illustrated in FIGS. 11 and 15.

In block 2080, the AMF 190-1 receives the HO request Ack message 2079 and sends a HO command 2081. The HO command 2081 is also illustrated in FIGS. 10 and 13. The source RAN node 170-1 receives the HO command 2081 in block 2035-1, delivers the HO command (as HO command 2043) to the UE in block 2040. The source RAN node 170-1 and target RAN node 170-2 perform the handover in blocks 2060 and 2065.

V. EXEMPLARY IMPLEMENTATION DETAILS

To implement the exemplary embodiments, a mechanism similar to "make-before-break indication" is used in NR, but to achieve the required flexibility, one or more of the following additions could still be needed.

It is noted that, if only one slice needs HO, then the HO may be performed with the single "make-before-break" flag, e.g., from LTE. On the other hand, as a UE is allowed to be simultaneously connected to up to eight slices, a "list" of HO type indication would be useful. Otherwise, there might have two different IEs, one for the single slice case and another for multiple slices. Having a list caters for both cases, e.g., where the list can also be of size one.

Therefore, one of the proposals herein is to modify the existing "make-before-break" single flag into a list of individual slices and their required HO type flags. Another exemplary option is to add the HO type flag in the PDU Session Resources To Be Setup Item for RAN-based HO or the PDU Session Resource Setup Item for Core-network-based HO. This would be totally different from current/ legacy specification. This way, the number of flags automatically depends on the number of Items we have in the PDU Session List, whose size could be one or more.

V.A. RAN-Based HO

For RAN-based HO (without involving the MME/AMF), the two X2AP/XnAP signaling messages "Handover Request" and "Handover Request Acknowledge" (see FIGS. 4 and 5) and the RRC Connection Reconfiguration message/ HO command (or their equivalent in NR) may be updated as follows.

V.A.1. "Handover Request" Sent by the Source BS to Target BS

The Handover Request message is illustrated in FIGS. 4 and 5. There are a number of options for this message.

i) Option 1: Include an extended Make-Before-Break Indication IE as part of the RRC Context 520 (see FIG. 5) in the HO Request Message. Consider "HandoverPreparationInformation"—for example for LTE (see FIG. 6). Currently, this IE contains only a binary tag for make-before-break (see makeBeforeBreakReq-r14 610), which can be either true or false for all the active connections of the UE. One implementation option in an exemplary embodiment is to make this field a list of required S-NSSAIs and their corresponding flag for the make-before-break/enhanced HO.

ii) Option 2: Include Make-Before-Break indication as part of the PDU Session List in the HO Request message (see FIG. 5) on Xn interfaces. "PDU Session Resources To Be Setup List"—this field 510 (see FIG. 5) in the HO Request contains all the PDU sessions to be setup during the HO and their corresponding S-NSSAIs. An alternative implementation option would be to add a network-slice specific make-before-break/enhanced HO flag in this IE.

V.A.2. "Handover Request Acknowledge" Sent by the Target BS to the Source BS

For preparing the handover command in current LTE Rel. 14, the target BS 170-1 uses one Boolean IE (true or false) to indicate whether make-before-break handover will be executed, as instructed by the source BS in a HO Request. To implement an exemplary proposed solution, the target BS could indicate a list of required S-NSSAIs and their corresponding flags for the make-before-break/enhanced HO when preparing the HO command to the UE. One option is to use the "Target NG-RAN node to Source NG-RAN node transparent container" 730 in FIG. 7.

In addition, the target BS 107-1 may include the make-before break/enhanced HO indication in the "PDU Session Resources Admitted List" 710 (see FIG. 7) which identifies the individual PDU sessions that are admitted by the target BS.

V.A.2. "RRC Connection Reconfiguration" (with Mobility Control Info) Sent by the Source BS to the UE The handover command prepared by the target BS 107-2 is sent to the UE 110 via the source BS 170-1. Currently for LTE, the RRC Connection Reconfiguration messages/HO command contains the mobility control information with make-before-break indication to notify the UE about the enhanced mobility option. For NR, a similar IE like ReconfigurationWithSync can be extended to include a list of required S-NSSAIs and their corresponding flag for the make-before-break/enhanced HO. ReconfigurationWithSync is the Information Element (IE) present in RRC Reconfiguration message sent by the network for HO purposes in NR (related behavior can be found in 3GPP TS 38.331, section 5.3.5). This is similar to the mobilityControlInfo IE, known from LTE (i.e., described in 3GPP TS 36.331) and also used in RRC Connection Reconfiguration to indicate this is a HO Command V.B. Core-Network-Based HO To implement the exemplary embodiments using the core-network-based HO, one or more of the following messages on a NG interface may be modified as described below.

V.B.1. "Handover Required" Sent by Source BS to AMF

A make-before-break or enhanced-HO indication can be added to the "PDU Session Resource Item" 1210 (see FIG. 12) and the corresponding PDU session ID 1220, which identify the individual PDU sessions to be supported during the HO.

Otherwise, the RRC Container within the "Source NG-RAN Node to Target NG-RAN Node Transparent Container" (see FIG. 19) can also be enhanced. This RRC Container includes the "HandoverPreparationInformation" (see FIG. 6), which can be enhanced with the list of S-NSSAI and its make-before-break/enhanced HO indication flag as also described above for the RAN-based HO.

V.B.2. "Handover Request" Sent from AMF to Target BS

Similar to the HO Required message, either the make-before-break/enhanced HO indication can be added to the "PDU Session Resource Setup Item" 1410 (see FIG. 14), which identifies the individual PDU sessions (e.g., via the PDU Session ID IE 1420) to be supported during the HO or if the "Source NG-RAN Node to Target NG-RAN Node Transparent Container" 1230 is enhanced in the HO Required message (see FIG. 12) then this can also be used to inform the target BS 170-2 about the specific mobility requirements of individual PDU sessions belonging to different slices/services.

V.B.3. "Handover Request Acknowledge" Sent from Target BS to AMF

A make-before-break/enhanced HO indication can be added to the "PDU Session Resource Admitted Item" 1510 (see FIG. 15) and its corresponding PDU Session ID IE 1520, and/or the "Target to Source Transparent Container" 1540 can be enhanced, which contains the RRC Container indicating the "HandoverCommand" message from the target BS. That is, the Target to Source transparent container includes an RRC container which includes the HandoverCommand, as illustrated in FIG. 16 and FIG. 17. This HandoverCommand extension would be similar to the RAN-based HO as described above.

V.B.4. "Handover Command" Sent from AMF to Source BS:

A make-before-break indication can be added to the "PDU Session Resource Handover Item" 1310 (see FIG. 13) (e.g., and its corresponding PDU Session ID IE 1320) and/or the enhanced "HandoverCommand" can be added to the RRC Container in the "Target to Source Transparent Container" 1330.

VI. FURTHER COMMENTS

Without in any way limiting the scope, interpretation, or application of the claims appearing below, technical effects and advantages of one or more of the example embodiments disclosed herein includes the following:

1) Provides the source cell with the flexibility to support the enhanced HO only for PDU sessions that require 0 ms or close to 0 ms service interruption. As such, the source BS can release (e.g., "immediately" and after sending the HO command) the PDU sessions for other network slices that do not require such features and saving in turn radio resources.

2) Allows the source cell to prioritize the services/slices that absolutely need 0 ms or close to 0 ms interruption time, in case the source cell cannot support the enhanced HO for all the services/slices due to overload in the system, e.g., caused by a high number of UEs.

3) To optionally support enhanced HO even for a service/slice that does not need 0 ms or close to 0 ms interruption time but the source cell offers the enhanced HO as a performance enhancement optimization when the source cell has the resources for the enhanced HO.

As such, the exemplary embodiments allow the flexibility for the source cell to apply different policies regarding the HO procedure to different services/slices that are simultaneously used by the same UE. The source cell might want to apply different HO policy based on, for example, the service characteristics or the connected services/slices or its own resource utilization status and optimization objectives.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

What is claimed is:

1. A method, comprising:
   providing, by a source cell and to a target cell in a wireless network, a list of one or more service/slice specific indications for individual ones of one or more network slices in a request for a first handover method of a user equipment from the source cell to the target cell, the providing performed in a handover preparation phase prior to handover of the user equipment;

receiving, by the source cell and from the target cell, indications in a handover request acknowledgement of one or more selected network slices to be handed over from the source cell to the target cell using the first handover method;

for the one or more selected network slices, performing handovers, using the first handover method, that maintain connection with the user equipment to both the source cell and target cell during at least part of the handovers that use the first handover method, to hand over for the user equipment these one or more selected network slices from the source cell to the target cell; and for one or more other network slices to be handed over for the user equipment from the source cell to the target cell, performing handovers using a second handover method for the one or more other network slices, wherein the user equipment does not maintain two simultaneous connections to the source cell and target cell during the second handover method.

2. The method of claim 1, wherein the list of the one or more service/slice specific indications in the request comprise a full list of network slices to be handed over, with their corresponding handover types, wherein both the one or more network slices for the first handover method and the one or more other network slices for the second handover method are in the full list.

3. The method of claim 1, wherein the list of the one or more service/slice specific indications in the request comprise only a list of network slices for the first handover method and the other network slices are assumed to be handed over with the second handover method.

4. The method of claim 1, wherein the handover request acknowledgement comprises acceptance or rejection indications at an individual slice level for all of the one or more service/slice specific indications, and the acceptance or rejection indications indicate at least the one or more selected network slices that have been selected by the target cell for the first handover method.

5. The method of claim 4, wherein the acceptance or rejection indications further indicate any of the one or more other network slices that have been selected by the target cell as the one or more other network slices for the second handover method and indicate any of the one or more selected network slices that have been rejected by the target cell for handover.

6. The method of claim 1, wherein the first handover method comprises an enhanced handover, and wherein the second handover method comprises a normal handover.

7. An apparatus, comprising:
at least one processor; and
at least one memory storing instructions that, when executed by the at least one processor, cause the apparatus at least to perform:
providing, by the apparatus and to a target cell in a wireless network, a list of one or more service/slice specific indications for individual ones of one or more network slices in a request for a first handover method of a user equipment from the apparatus to the target cell, the providing performed in a handover preparation phase prior to handover of the user equipment;
receiving, by the apparatus and from the target cell, indications in a handover request acknowledgement of one or more selected network slices to be handed over from the apparatus to the target cell using the first handover method;

for the one or more selected network slices, perform handovers, using the first handover method, that maintain connection with the user equipment to both the source cell and target cell during at least part of the handovers that use the first handover method, to hand over for the user equipment these one or more selected network slices from the apparatus to the target cell; and for one or more other network slices to be handed over for the user equipment from the apparatus to the target cell, performing handovers using a second handover method for the one or more other network slices wherein the user equipment does not maintain two simultaneous connections to the source cell and target cell during the second handover method.

8. The apparatus of claim 7, wherein the list of the one or more service/slice specific indications in the request comprise a full list of network slices to be handed over, with their corresponding handover types, wherein both the one or more network slices for the first handover method and the one or more other network slices for the second handover method are in the full list.

9. The apparatus of claim 7, wherein the list of the one or more service/slice specific indications in the request comprise only a list of network slices for the first handover method and the other network slices are assumed to be handed over with the second handover method.

10. The apparatus of claim 7, wherein the handover request acknowledgement comprises acceptance or rejection indications at an individual slice level for all of the one or more service/slice specific indications, and the acceptance or rejection indications indicate at least the one or more selected network slices that have been selected by the target cell for the first handover method.

11. The apparatus of claim 10, wherein the acceptance or rejection indications further indicate any of the one or more other network slices that have been selected by the target cell as the one or more other network slices for the second handover method and indicate any of the one or more selected network slices that have been rejected by the target cell for handover.

12. The apparatus of claim 7, wherein the first handover method comprises an enhanced handover, and wherein the second handover method comprises a normal handover.

13. An apparatus, comprising:
at least one processor; and
at least one memory storing instructions that, when executed by the at least one processor, cause the apparatus at least to perform:
receiving, at the apparatus in a wireless network and from a source cell in the wireless network, a list of one or more service/slice specific indications for individual ones of one or more network slices in a request for a first handover method for a user equipment from the source cell to the apparatus, the receiving performed in a handover preparation phase prior to handover of the user equipment;
selecting, by the apparatus and from the indications, one or more selected network slices to be handed over from the source cell to the apparatus using the first handover method; send, by the apparatus and to the source cell, indications of the one or more selected network slices in a handover request acknowledge message;
for those one or more selected network slices, performing handovers, using the first handover method, that maintain connection with the user equipment to both the source cell and target cell during at least part of the handovers that use the first handover method., to hand over for the user equipment these one or more selected network slices from the source cell to the apparatus; and for one or more other network slices to be handed over for the user equipment from the source cell to the apparatus, performing handovers using a second handover method for the one or more other network slices, wherein the user equipment does not maintain two simultaneous connections to the source cell and target cell during the second handover method.

14. The apparatus of claim 13, wherein the list of the one or more service/slice specific indications in the request comprise a full list of network slices to be handed over, with their corresponding handover types, wherein both the one or more network slices for the first handover method and the one or more other network slices for the second handover method are in the full list.

15. The apparatus of claim 13, wherein the list of the one or more service/slice specific indications in the request comprise only a list of network slices for the first handover method and the other network slices are assumed to be handed over with the second handover method.

16. The apparatus of claim 13, wherein the handover request acknowledgement message comprises acceptance or rejection indications at an individual slice level for all of the one or more service/slice specific indications, and the acceptance or rejection indications indicate at least the one or more selected network slices that have been selected by the apparatus for the first handover method.

17. The apparatus of claim 16, wherein the acceptance or rejection indications further indicate any of the one or more selected network slices that have been selected by the apparatus as the one or more other network slices for the second handover method and indicate any of the one or more selected network slices that have been rejected by the apparatus for handover.

18. The apparatus of claim 13, wherein the first handover method comprises an enhanced handover, and wherein the second handover method comprises a normal handover.

19. An apparatus, comprising:
at least one processor; and
at least one memory storing instructions that, when executed by the at least one processor, cause the apparatus at least to perform:
receiving, at the apparatus and from a source cell in a wireless network, a list of one or more service/slice specific indications for individual ones of one or more network slices in a handover required message for a first handover method of the apparatus from the source cell to a target cell in the wireless network, the receiving performed in a handover preparation phase prior to handover of the apparatus, the first handover method to maintain connection with the apparatus to both the source cell and target cell during at least part of the handovers that use the first handover method;

sending by the apparatus the list of one or more service/slice specific indications to the target cell in a handover request message;

receiving, by the apparatus and from the target cell, indications in a handover request acknowledgement of one or more selected network slices to be handed over for the apparatus from the source cell to the target cell using the first handover method, wherein there are one or more other network slices to be handed over for the apparatus from the source cell to the target cell using a second handover method wherein the apparatus does not maintain two simultaneous connections to the source cell and target cell during the second handover method;

sending by the apparatus to the source cell the indications of the one or more selected network slices in a handover command message.

20. The apparatus of claim 19, wherein the list of the one or more service/slice specific indications in the handover request message comprises a full list of network slices to be handed over, with their corresponding handover types, wherein both the one or more network slices for the first handover method and the one or more other network slices for the second handover method are in the full list.

21. The apparatus of claim 19, wherein the list of the one or more service/slice specific indications in the handover request message only a list of network slices for the first handover method and the other network slices are assumed to be handed over with the second handover method.

22. The apparatus of claim 19, wherein the handover request acknowledgement comprises acceptance or rejection indications at an individual slice level for all of the one or more service/slice specific indications, and the acceptance or rejection indications indicate at least the one or more selected network slices that have been selected by the target cell for the first handover method.

23. The apparatus of claim 22, wherein the acceptance or rejection indications further indicate any of the one or more selected network slices that have been selected by the target cell as the one or more other network slices for the second handover method and indicate any of the one or more selected network slices that have been rejected by the target cell for handover.

24. The apparatus of claim 19, wherein the first handover method comprises an enhanced handover, and wherein the second handover method comprises a normal handover.

* * * * *